US011986866B2

(12) United States Patent
Pierson

(10) Patent No.: US 11,986,866 B2
(45) Date of Patent: May 21, 2024

(54) COATING REMOVAL TOOL

(71) Applicant: James T. Pierson, Williston, VT (US)

(72) Inventor: James T. Pierson, Williston, VT (US)

( * ) Notice: Subject to any disclaimer, the term of this patent is extended or adjusted under 35 U.S.C. 154(b) by 45 days.

(21) Appl. No.: 17/903,020

(22) Filed: Sep. 5, 2022

(65) Prior Publication Data

US 2023/0001459 A1 Jan. 5, 2023

Related U.S. Application Data

(63) Continuation of application No. 16/382,696, filed on Apr. 12, 2019, now Pat. No. 11,433,437.

(60) Provisional application No. 62/657,057, filed on Apr. 13, 2018.

(51) Int. Cl.

*B08B 5/04* (2006.01)
*A47L 9/06* (2006.01)
*B08B 1/00* (2024.01)
*B08B 1/16* (2024.01)

(52) U.S. Cl.

CPC .............. *B08B 5/04* (2013.01); *A47L 9/0606* (2013.01); *B08B 1/165* (2024.01)

(58) Field of Classification Search

CPC .......... A47L 13/08; A47L 9/02; A47L 9/0606; B08B 1/005; B08B 5/04; B44D 3/164

See application file for complete search history.

(56) References Cited

U.S. PATENT DOCUMENTS

| | | | | |
|---|---|---|---|---|
| 2,879,530 A * | 3/1959 | Ego | A47L 11/4094 | 15/245.1 |
| 4,947,515 A * | 8/1990 | Ivarsson | A47L 9/02 | 15/322 |
| 5,097,554 A * | 3/1992 | McLaughlin | B25F 1/00 | 7/105 |
| 5,184,371 A * | 2/1993 | Rands | A47L 9/32 | 15/325 |
| 5,184,372 A * | 2/1993 | Mache | A47L 13/11 | 15/245 |
| 5,575,035 A * | 11/1996 | Reis | A47L 13/02 | 15/345 |
| 6,070,292 A * | 6/2000 | Langelaan | A47L 13/022 | 15/401 |

(Continued)

FOREIGN PATENT DOCUMENTS

| | | | |
|---|---|---|---|
| EP | 2433538 A1 * | 3/2012 | A47L 9/02 |
| FR | 2792817 A1 * | 11/2000 | A47L 9/02 |

(Continued)

*Primary Examiner* — Marc Carlson

(74) *Attorney, Agent, or Firm* — Miele Law Group

(57) ABSTRACT

A HEPA-qualified coating removal system, coating removal tool, and method is disclosed. The HEPA-qualified coating removal system comprises a HEPA-vacuum coupled to a coating removal tool via a vacuum line. A method of using the HEPA-qualified coating removal system includes, but is not limited to, the steps of the user putting on appropriate protective equipment, connecting the vacuum line of the HEPA-vacuum to an outlet of the coating removal tool, activating the HEPA-vacuum, using scraping motion of coating removal tool to strip a surface and the resulting loose debris being removed by suction force from the environment, deactivating the HEPA-vacuum, and disposing of the debris collected in the HEPA vacuum.

9 Claims, 39 Drawing Sheets

(56) References Cited

U.S. PATENT DOCUMENTS 6,272,708 B1 * 8/2001 Chen ........................ B25G 1/04 30/169
6,601,266 B1 * 8/2003 Faraci ................. A47L 11/4075 15/246.2
D540,994 S * 4/2007 Borges ........................... D32/33
7,370,390 B1 * 5/2008 Muller ...................... A47L 9/02 15/415.1
7,805,805 B2 * 10/2010 Loveless ............... A47L 9/0673 15/246.2
7,814,609 B1 * 10/2010 Shumway ................. A47L 9/06 30/169
D659,315 S * 5/2012 Hollis ............................ D32/33
8,555,463 B1 * 10/2013 Laube .................. A01K 13/002 119/606
8,719,988 B2 * 5/2014 Lundin .................. B44D 3/164 15/93.1
D789,634 S * 6/2017 Witter ............................ D32/32
9,782,048 B2 * 10/2017 Witter ................... A47L 9/0626
2002/0026672 A1 * 3/2002 Bloom ................... B44D 3/164 7/105
2003/0159241 A1 * 8/2003 Calzolari .................. A47L 9/02 15/401
2005/0144753 A1 * 7/2005 Pulliam ................. A47L 9/0606 15/401
2006/0080843 A1 * 4/2006 Gringer .................. B44D 3/164 30/172
2008/0109986 A1 * 5/2008 Loveless ............... A47L 9/0673 15/401
2008/0178393 A1 * 7/2008 Kinskey ................... B25G 1/04 7/105
2011/0099746 A1 * 5/2011 Brown ...................... A47L 5/24 15/401
2012/0137445 A1 * 6/2012 Arvinte ................... B25F 1/006 7/165
2012/0180226 A1 * 7/2012 Pedersen ................. B25F 1/006 7/144
2013/0283541 A1 * 10/2013 Cridlebaugh ........... B25F 1/006 7/144
2013/0306107 A1 * 11/2013 Jensen .................... A47L 7/009 15/246.2
2015/0128998 A1 * 5/2015 Nemedi .................... B08B 5/04 134/21
2016/0066756 A1 * 3/2016 Walker ...................... A47L 1/05 15/322
2016/0257163 A1 * 9/2016 Levand ..................... B25F 1/02
2016/0270612 A1 * 9/2016 Witter ........................ A47L 9/06
2017/0021267 A1 * 1/2017 Kessinger .............. B44D 3/162
2017/0225314 A1 * 8/2017 Levand .................... B25G 3/32
2019/0029488 A1 * 1/2019 Evans ................. A47L 11/4094
2019/0039103 A1 * 2/2019 Morris, Sr. ......... A47L 11/4036
2019/0314870 A1 * 10/2019 Pierson ................... A47L 13/08
2020/0205637 A1 * 7/2020 Yang ....................... A47L 13/10

FOREIGN PATENT DOCUMENTS

SE 0311583 A1 * 4/1989
WO WO-2018184390 A1 * 10/2018 ............. A01K 13/00

* cited by examiner

Table 500

Test Report: Lead in Air by Flame AAS (NIOSH 7082)

| Client Sample Description | Lab ID | Collected | Analyzed | Volume | Lead Concentration |
|---|---|---|---|---|---|
| 1<br>Site: 14 Germain | 0001 | 2/9/2009 | 2/24/2009 | 600 L | <6.7 μg/m$^3$ |
| 2<br>Site: 14 Germain | 0002 | 2/9/2009 | 2/24/2009 | 750 L | <5.3 μg/m$^3$ |
| 3<br>Site: 462 S. Union | 0003 | 2/9/2009 | 2/24/2009 | 1050 L | 46 μg/m$^3$ |
| 4<br>Site: 76 King | 0004 | 2/9/2009 | 2/24/2009 | 675 L | 31 μg/m$^3$ |
| 5<br>Site: 15 Hyde | 0005 | 2/9/2009 | 2/24/2009 | 810 L | 260 μg/m$^3$ |
| 6<br>Site: 54 Clarke | 0006 | 2/9/2009 | 2/24/2009 | 612 L | 13 μg/m$^3$ |
| 7<br>Site: 54 Clarke | 0007 | 2/9/2009 | 2/24/2009 | 518 L | 11 μg/m$^3$ |

*FIG. 34*

Table 600

Test Report: Lead in Air by Flame AAS (NIOSH 7082)

| Client Sample Description | Lab ID | Collected | Analyzed | Volume | Lead Concentration |
|---|---|---|---|---|---|
| 1<br>Site: 54 Clark St. | 0001 | | 6/5/2009 | 1075 L | 31 μg/m$^3$ |
| 2<br>Site: 54 Clark St. | 0002 | | 6/5/2009 | 925 L | 51 μg/m$^3$ |
| 3<br>Site: 54 Clark St. | 0003 | | 6/5/2009 | 735 L | 9.1 μg/m$^3$ |
| 4<br>Site: 54 Clark St. | 0004 | | 6/5/2009 | 856 L | <4.7 μg/m$^3$ |
| 5<br>Site: 178 N. Winooski Ave | 0005 | | 6/5/2009 | 825 L | <4.8 μg/m$^3$ |
| 6<br>Site: 178 N. Winooski Ave | 0006 | | 6/5/2009 | 1000 L | <4.0 μg/m$^3$ |
| 7<br>Site: 178 N. Winooski Ave | 0007 | | 6/5/2009 | 450 L | <8.9 μg/m$^3$ |
| 8<br>Site: 32 St. Paul St. | 0008 | | 6/5/2009 | 432 L | 300 μg/m$^3$ |
| 9<br>Site: 32 St. Paul St | 0009 | | 6/5/2009 | 669 L | 210 μg/m$^3$ |
| 10<br>Site: 32 St. Paul St | 0010 | | 6/5/2009 | 609 L | 7.6 μg/m$^3$ |
| 11<br>Site: 77-79 Main St. | 0011 | | 6/5/2009 | 546 L | <7.3 μg/m$^3$ |
| 12<br>Site: 19 Highland Ave. | 0012 | | 6/5/2009 | 581 L | 51 μg/m$^3$ |
| 13<br>Site: 16 Rose St. | 0013 | | 6/5/2009 | 937 L | <4.3 μg/m$^3$ |

*FIG. 35*

Table 700

Test Report: Lead in Air by Flame AAS (NIOSH 7082)

| Client Sample Description | Lab ID | Collected | Analyzed | Volume | Lead Concentration |
|---|---|---|---|---|---|
| 14<br>Site: 16 Rose St. | 0014 | | 6/5/2009 | 525 L | <7.6 μg/m$^3$ |
| 15<br>Site: McAuley Hall-UVM | 0015 | | 6/5/2009 | 1080 L | 4.9 μg/m$^3$ |
| 16<br>Site: McAuley Hall-UVM | 0016 | | 6/5/2009 | 1080 L | <3.7 μg/m$^3$ |
| 17<br>Site: McAuley Hall-UVM | 0017 | | 6/5/2009 | 1080 L | <3.7 μg/m$^3$ |
| 18<br>Site: McAuley Hall-UVM | 0018 | | 6/5/2009 | 1080 L | <3.7 μg/m$^3$ |

*FIG. 36*

Table 800

Test Report: Lead in Air by Flame AAS (NIOSH 7082)

| Client Sample Description | Lab ID | Collected | Analyzed | Volume | Lead Concentration |
|---|---|---|---|---|---|
| 1<br>Site: 130 W. St. | 0001 | | 4/20/2010 | 675 L | 7.0 μg/$m^3$ |
| 2<br>Site: St. Albans | 0002 | | 4/20/2010 | 1050 L | <3.8 μg/$m^3$ |
| 3<br>Site: 40 Int. #8 | 0003 | | 4/20/2010 | 1012 L | <4.0 μg/$m^3$ |

*FIG. 37*

Table 900

Test Report: Lead in Air by Flame AAS (NIOSH 7082)

| Client Sample Description | Lab ID | Collected | Analyzed | Volume | Lead Concentration |
|---|---|---|---|---|---|
| 1<br>Site: 130 W. Spring | 0001 | 3/29/2010 | 10/13/2010 | 911 L | 33 μg/m³ |
| 2<br>Site: 2 Mechanic | 0002 | 6/18/2010 | 10/13/2010 | 731 L | <5.5 μg/m³ |
| 3<br>Site: 2 Mechanic | 0003 | 8/20/2010 | 10/13/2010 | 1092 L | <3.7 μg/m³ |
| 4<br>Site: 83-85 Park | 0004 | 9/23/2010 | 10/13/2010 | 1125 L | <3.6 μg/m³ |
| 5<br>Site: 83-85 Park | 0005 | 9/28/2010 | 10/13/2010 | 1075 L | <3.7 μg/m³ |
| 6<br>Site: 2 Mechanic | 0006 | 9/29/2010 | 10/13/2010 | 1087 L | <3.7 μg/m³ |

*FIG. 38*

Table 1000

Test Report: Lead in Air by Flame AAS (NIOSH 7082)

| Client Sample Description | Lab ID | Collected | Analyzed | Volume | Lead Concentration |
|---|---|---|---|---|---|
| 1<br>Site: 24 Front St (Set Up) | 0001 | | 3/2/2011 | 912 L | <4.4 μg/$m^3$ |
| 2<br>Site: 24 Front St (Set Up) | 0002 | | 3/2/2011 | 1056 L | <3.8 μg/$m^3$ |
| 3<br>Site: 24 Front St (HEPA Scraping) | 0003 | | 3/2/2011 | 768 L | 98 μg/$m^3$ |
| 4<br>Site: 24 Front St (HEPA Scraping) | 0004 | | 3/2/2011 | 769 L | 40 μg/$m^3$ |

*FIG. 39*

COATING REMOVAL TOOL

CROSS-REFERENCE TO RELATED APPLICATIONS

This is a continuation of U.S. application Ser. No. 16/382,696 filed Apr. 12, 2019, which claims priority to U.S. Provisional Application 62/657,057 filed Apr. 13, 2018, the disclosures of which were hereby incorporated by reference herein in their entireties.

TECHNICAL FIELD

The present disclosed subject matter relates generally to systems and methods for stripping surfaces and more particularly to a HEPA-qualified coating removal system, coating removal tool, and method.

BACKGROUND

In, for example, building restoration/renovation/maintenance projects, effort must be made to minimize workers' personal exposure to, for example, lead and/or asbestos in an abatement work area as well as to minimize the amount of debris/dust disbursed into the air and on the containment area. The U.S. Environmental Protection Agency (EPA) requirement for all renovations is that repairs or painting projects that disturb more than 6 square feet per room of interior painted surface or 20 square feet of exterior painted surface in a pre-1978 dwelling which require High-Efficiency Particulate Air (HEPA) vacuums to clean up the work areas and comply with the lead-safe work practices required when performing the work.

When stripping, for example, doorjambs, window sills, and thresholds to bare wood, debris/dust is generated and there can be great potential of worker exposure to this debris/dust. The current work practice method approved by HUD/EPA/VT Department of Health is a "wetting" or "misting" process, in which the surface to be stripped is wetted or misted as it is being worked on. However, a drawback of this practice is that the wetting or misting process often destroys the wood fabric, which is not allowed, particularly when performing historic restorations. However, while the wetting or misting process is a proven effective way to minimize exposure to airborne debris/dust, if the surface is not wetted or misted constantly, especially during the actual scraping process, the dry failing coatings underneath the failing paint become airborne and very toxic. Further, the wetting or misting process is a messy process and does not allow immediate sealing or priming of the surface, as the surface is left wet and needs time to dry. Wetting and misting also cause the grain of wood to be lifted, requiring sanding of the lifted grains.

Scrapers or other coating removal tools exist today for performing surface restoration, wherein these scrapers or other coating removal tools may be used in combination with a HEPA-vacuum. However, these tools may have certain shortcomings. For example, the intake portion of these scrapers or other coating removal tools are not optimally sized and/or shaped to prevent clogging. Further, the blades of these tools are not designed to handle different kinds, shapes, and contours of surfaces to be restored. Therefore, new approaches are needed with respect to performing surface restorations/renovations safely and effectively.

SUMMARY

The invention provides generally systems, devices, and methods for removing coatings from surface. In one embodiment, the invention provides a coating removal system including a coating removal tool having a scraper handle, a scraper head, and a blade, the scraper handle and the scraper head being integral, the scraper handle having an outlet, and the scraper head has an intake. The coating removal system also includes a vacuum, the coating removal tool connected to the vacuum by a vacuum line.

In one example, the vacuum of the coating removal system is a HEPA-vacuum. In another example, the scraper handle and the scraper head are a single piece of a material, including without limitation plastic, aluminum, or other lightweight, rigid material that is adapted for molding.

In another example, the outlet is adapted to receive the vacuum line, and wherein the intake is a side-facing opening with respect to the center longitudinal axis of the scraper handle.

The scraper head can have non-converging sides that form an intake with a wide-shaped opening Also, the intake may have a leading edge, a trailing edge, and two side edges, the edges being of similar lengths to form the wide-shaped opening. In yet another example, the leading edge is adapted to hold the blade.

In still another example, the blade has an upper edge, a lower edge, a first leading corner, and a second leading corner, and can be of varying width. The blade may be a flat, straight blade that is secured to the leading edge, such as by a stabilizer member and/or a fastener. In one example, the blade may be between the stabilizer member and the leading edge.

In yet another example, the two side edges of the intake are arch-shaped. In another example, the two side edges are squared off toward the upper edge of the blade.

In still another example, the first leading corner and the second leading corner of the blade are squared. Alternatively, the first leading corner and the second leading corner are rounded. In another alternative, one of the first leading corner and the second leading corner is rounded, and the other of the first leading corner and the second leading corner is squared.

In another embodiment, the coating removal tool described above includes a scraper affixed to the scraper handle, the scraper including the blade and a handle portion, the handle portion being fastened to the scraper head such that the blade is positioned at the intake. In one example, the scraper head has a top portion that is flattened and includes a V-cut portion that is adapted to be fitted with the scraper.

In another embodiment, the coating removal tool includes a flexible, stretchable overmolded sleeve surrounding the coating removal tool.

In still another embodiment, the coating removal tool includes a hammerhead integrated into the scraper handle. In one example, the scraper handle has a wall with a cavity adapted to receive the hammerhead, and the hammerhead and the wall are flush. In another example, the hammerhead is a single piece integrated in to the scraper handle.

In yet another embodiment, the coating removal tool has a wall with embedded reinforcing members.

In still another embodiment, the coating removal system includes a coating removal tool having a scraper handle, a scraper head, and a vertical member having a blade and a hammerhead, the scraper handle and the scraper head are formed by a pair of body sides to form a single hollow member, the pair of body sides being a body right side and a body left side, the body left side and the body right side are held together by a connector, the scraper handle having an outlet and the scraper head having an intake, the hammerhead being at the upper end of the vertical member and the blade being at the lower end of the vertical member, the vertical member being between the body right side and the body left side; and a vacuum connected to the coating removal tool by a vacuum line.

A method of the present invention includes the steps of: 1) providing a target surface with a coating that is to be removed; 2) providing a coating removal system, the coating removal system including: a coating removal tool having a scraper handle, a scraper head, and a blade, the scraper handle and the scraper head being integral, the scraper handle having an outlet and the scraper head having an intake; and a vacuum, the coating removal tool connected to the vacuum by a vacuum line; 3) applying protective gear by a user of the coating removal system; 4) connecting the vacuum line to the outlet of the coating removal tool; 5) activating the vacuum to provide a suction force in the coating removal tool; 6) removing the coating by imparting a scraping motion by the user of the coating removal tool to the target surface to remove the coating and loose debris resulting from the scraping motion; 7) collecting in the vacuum the coating and the loose debris; 8) deactivating the vacuum upon completion of or any temporary suspension of the removing step; and 9) disposing of debris collected in the vacuum.

BRIEF DESCRIPTION OF THE DRAWINGS

Figure 1:
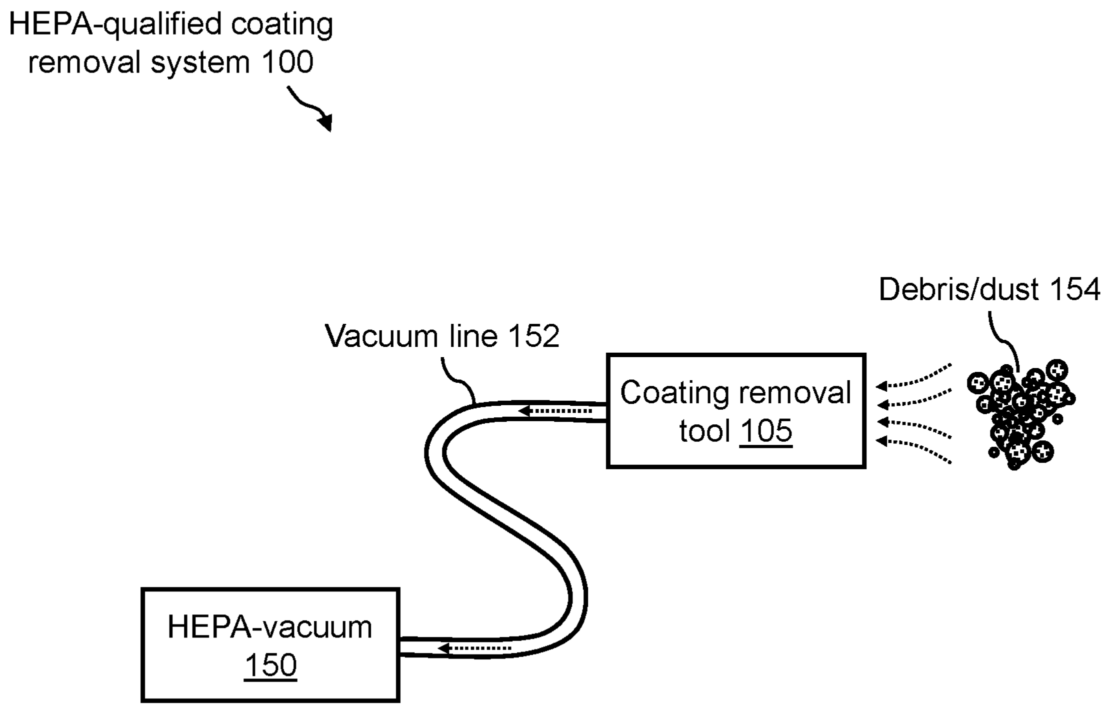
Figure 2:
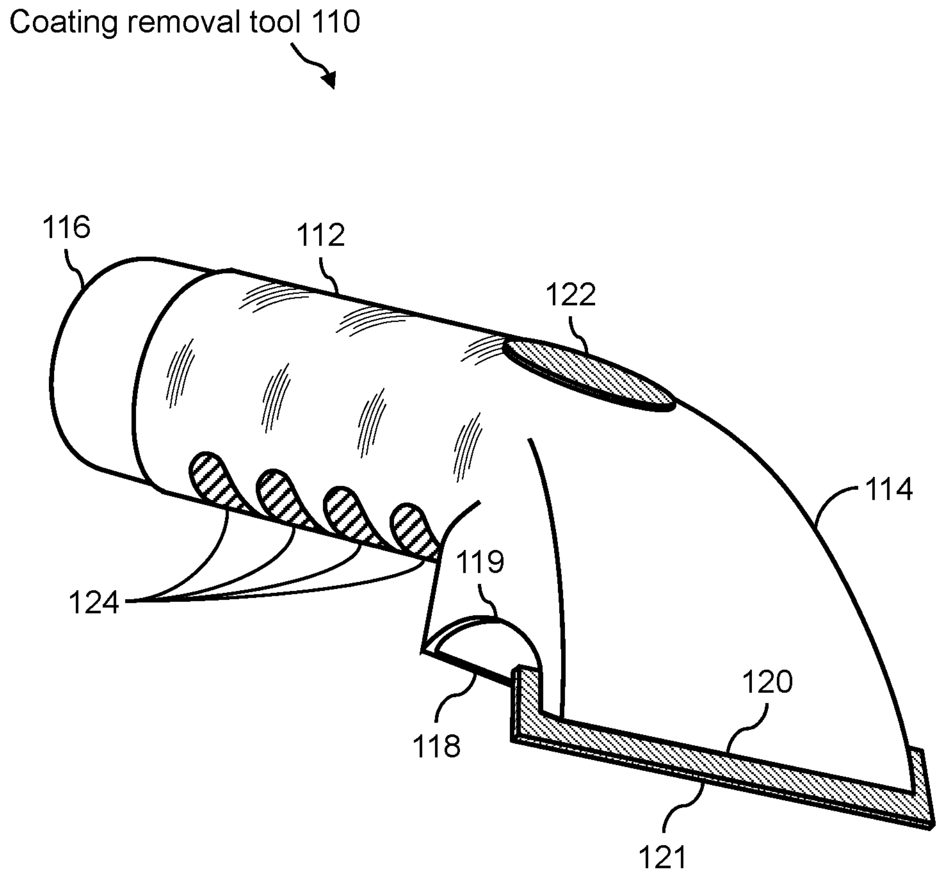
Figure 3A:
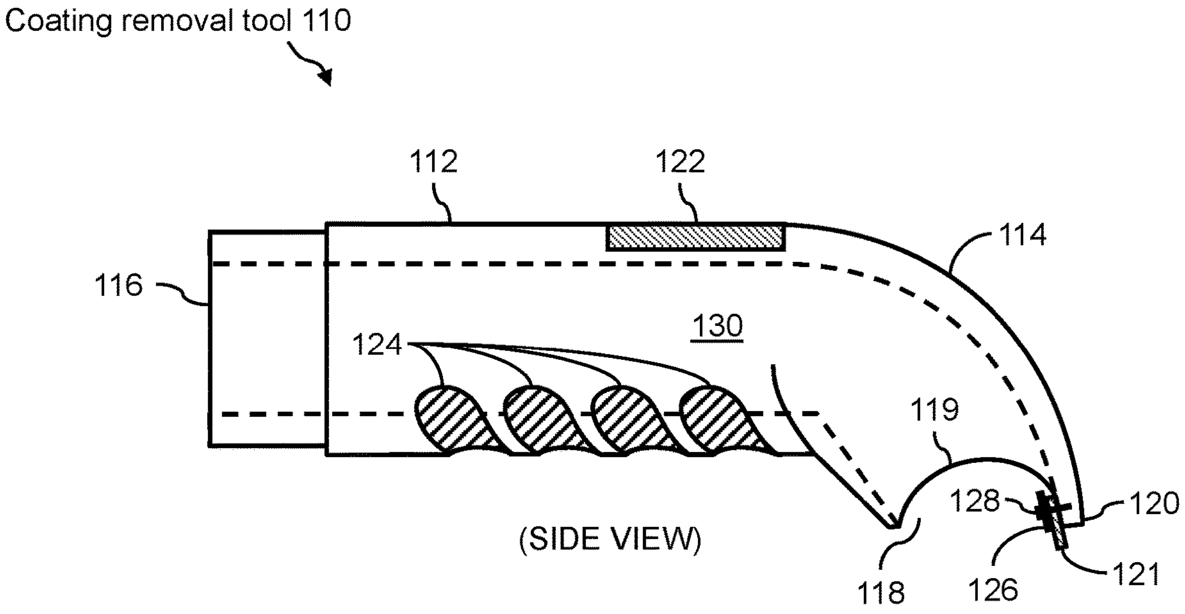
Figure 3B:
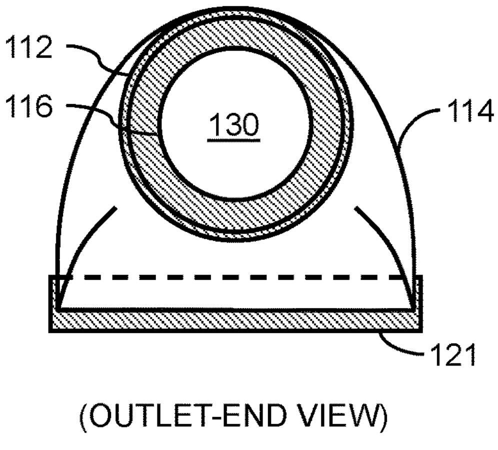
Figure 3C:
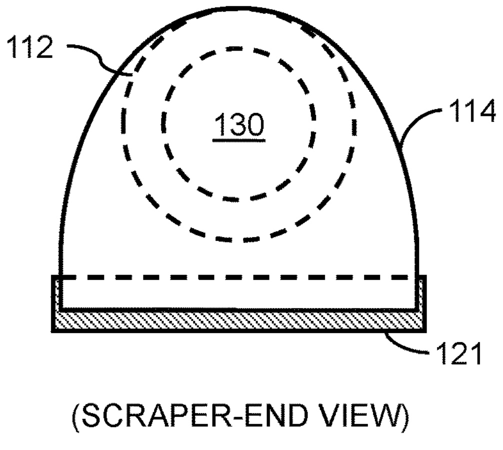
Figure 4A:
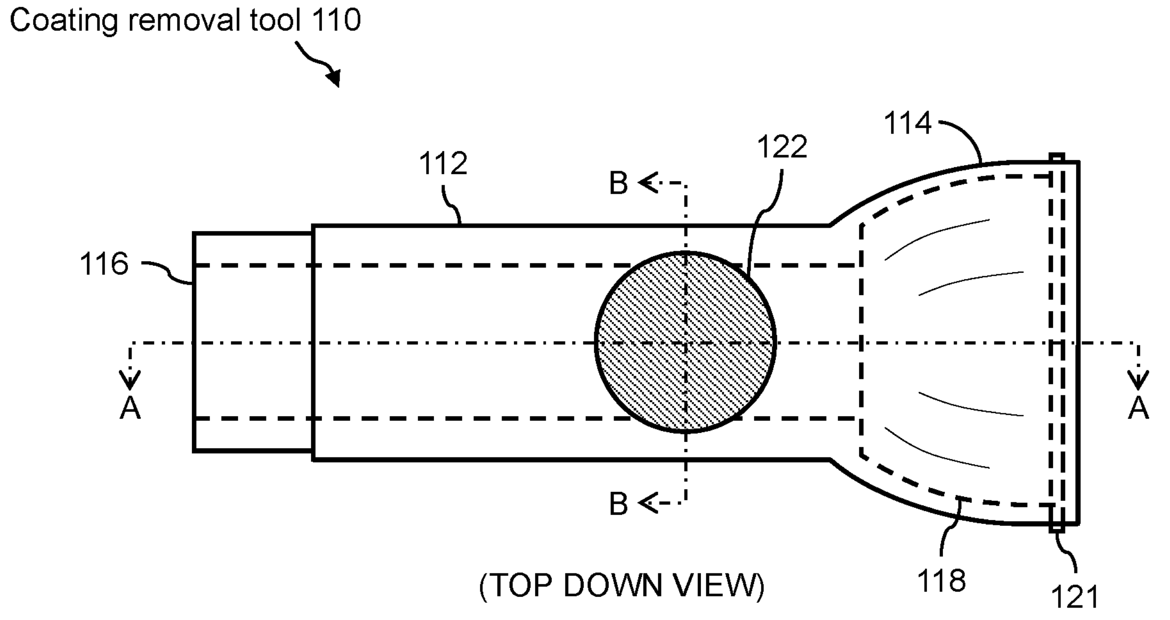
Figure 4B:
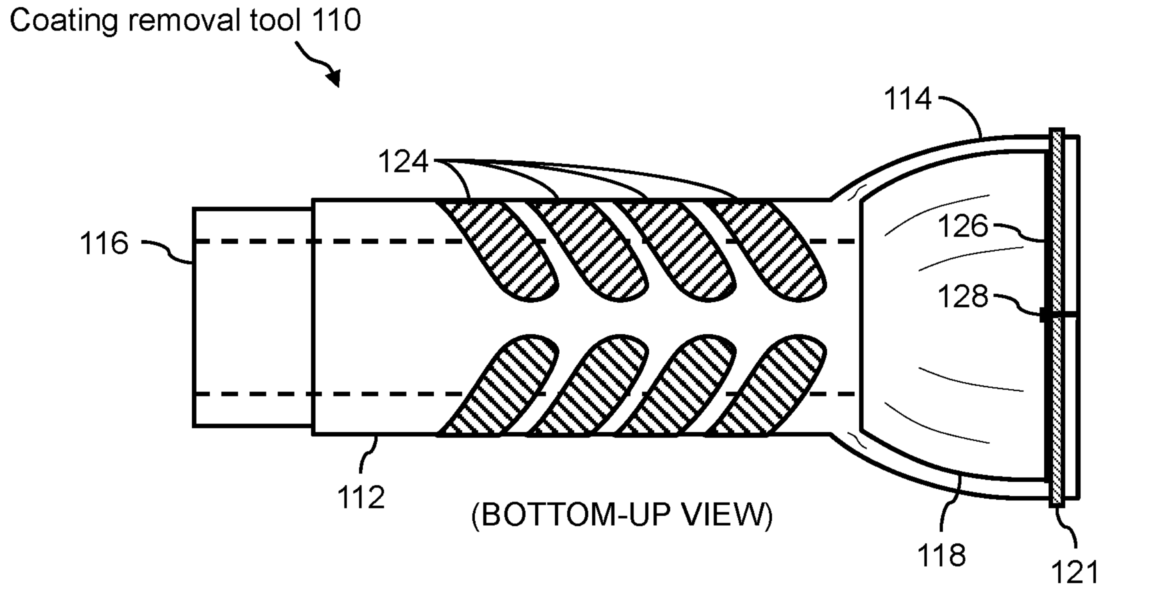
Figure 5A:
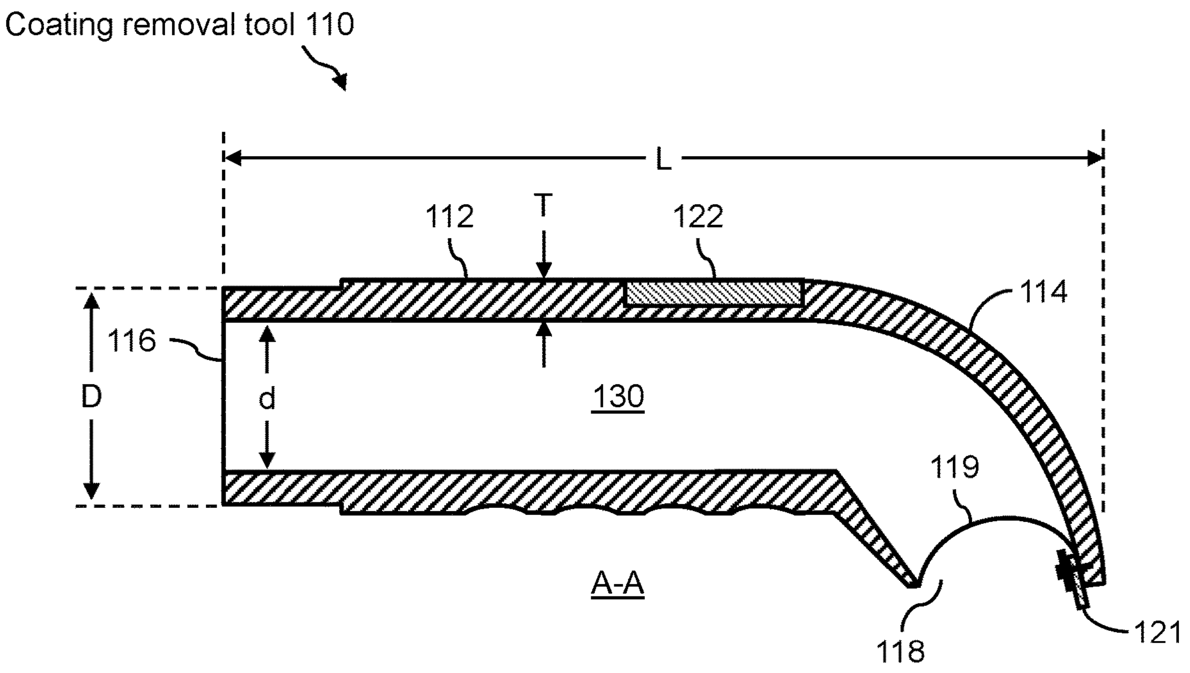
Figure 5B:
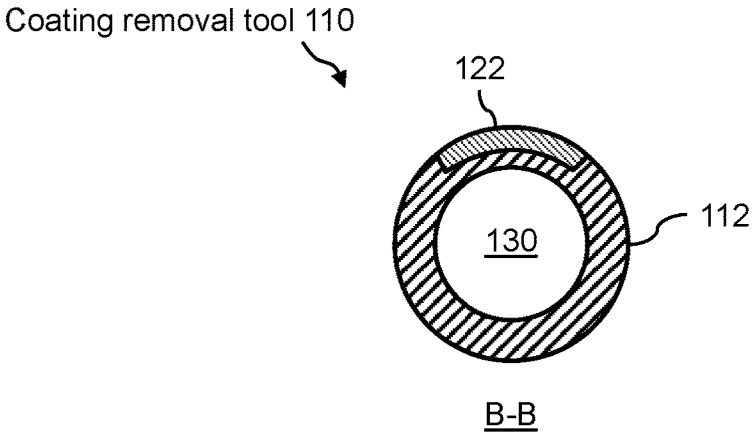
Figure 6A:
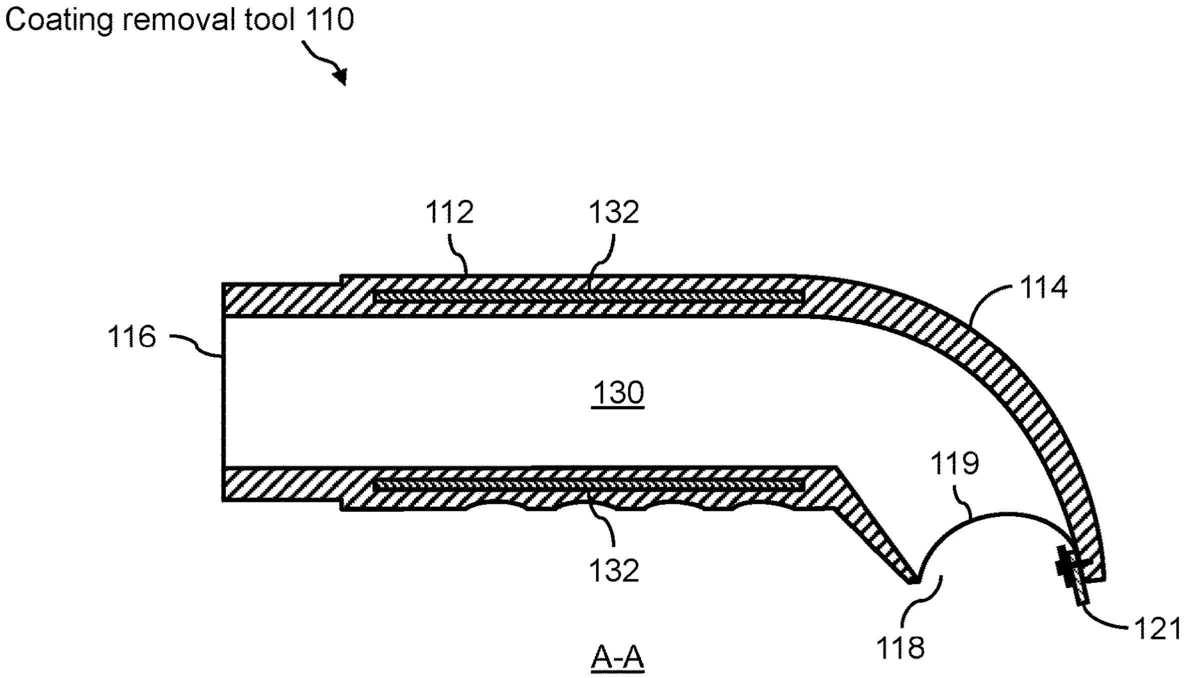
Figure 6B:
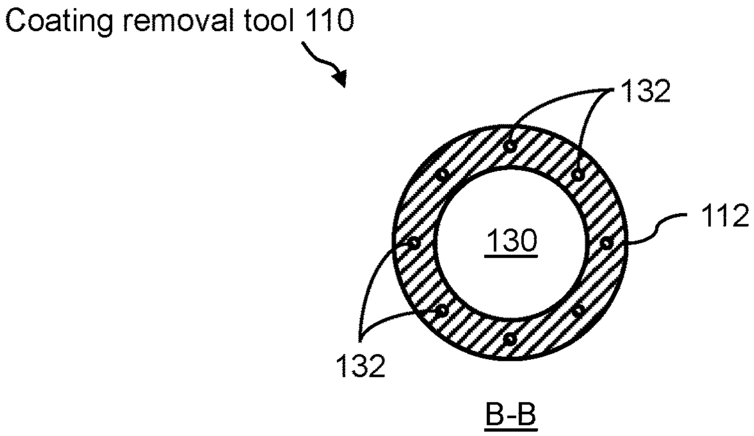
Figure 7A:
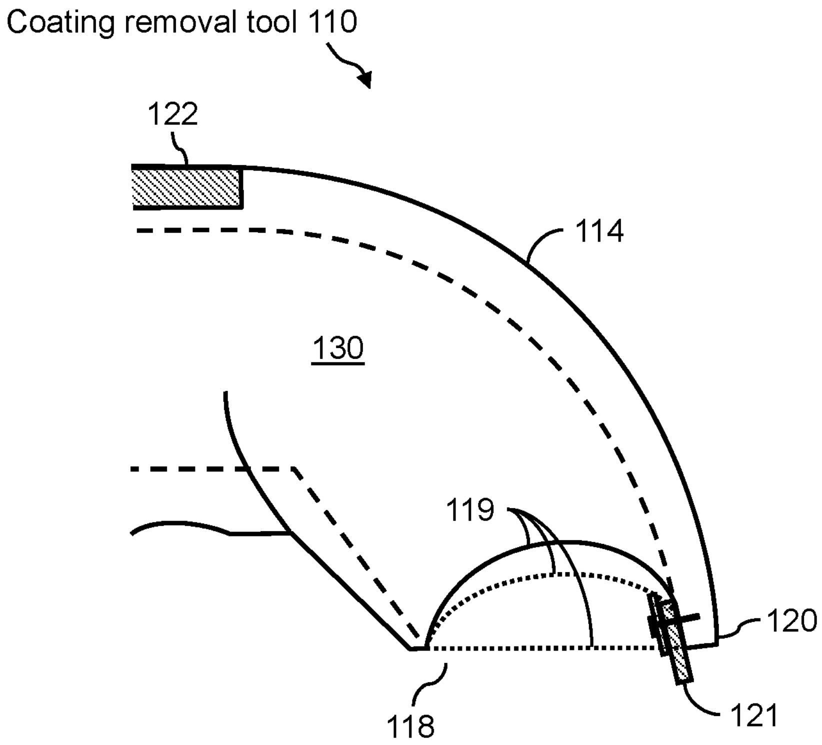
Figure 7B:
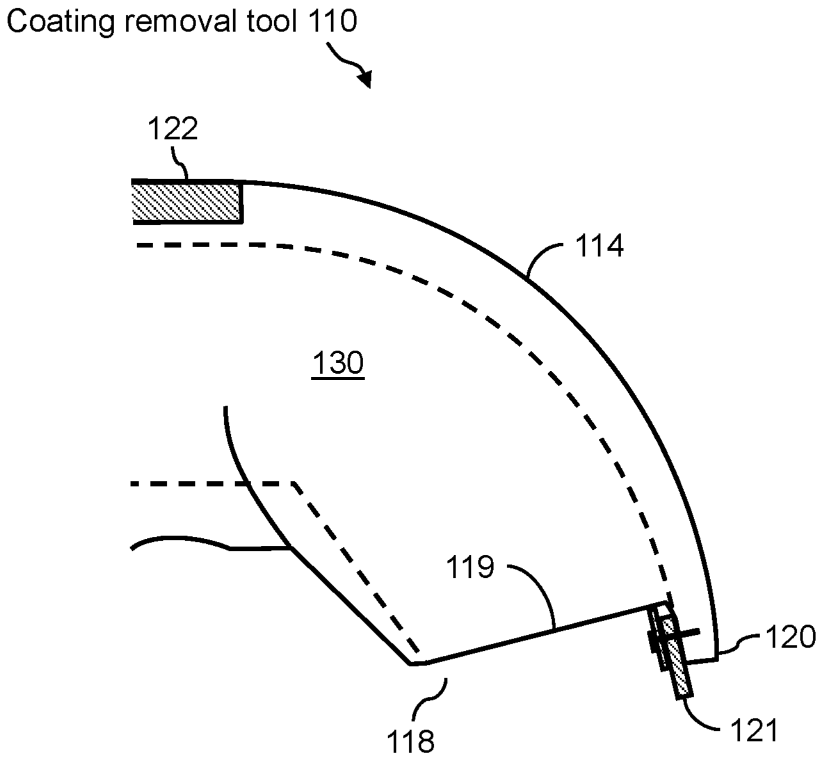
Figure 8:
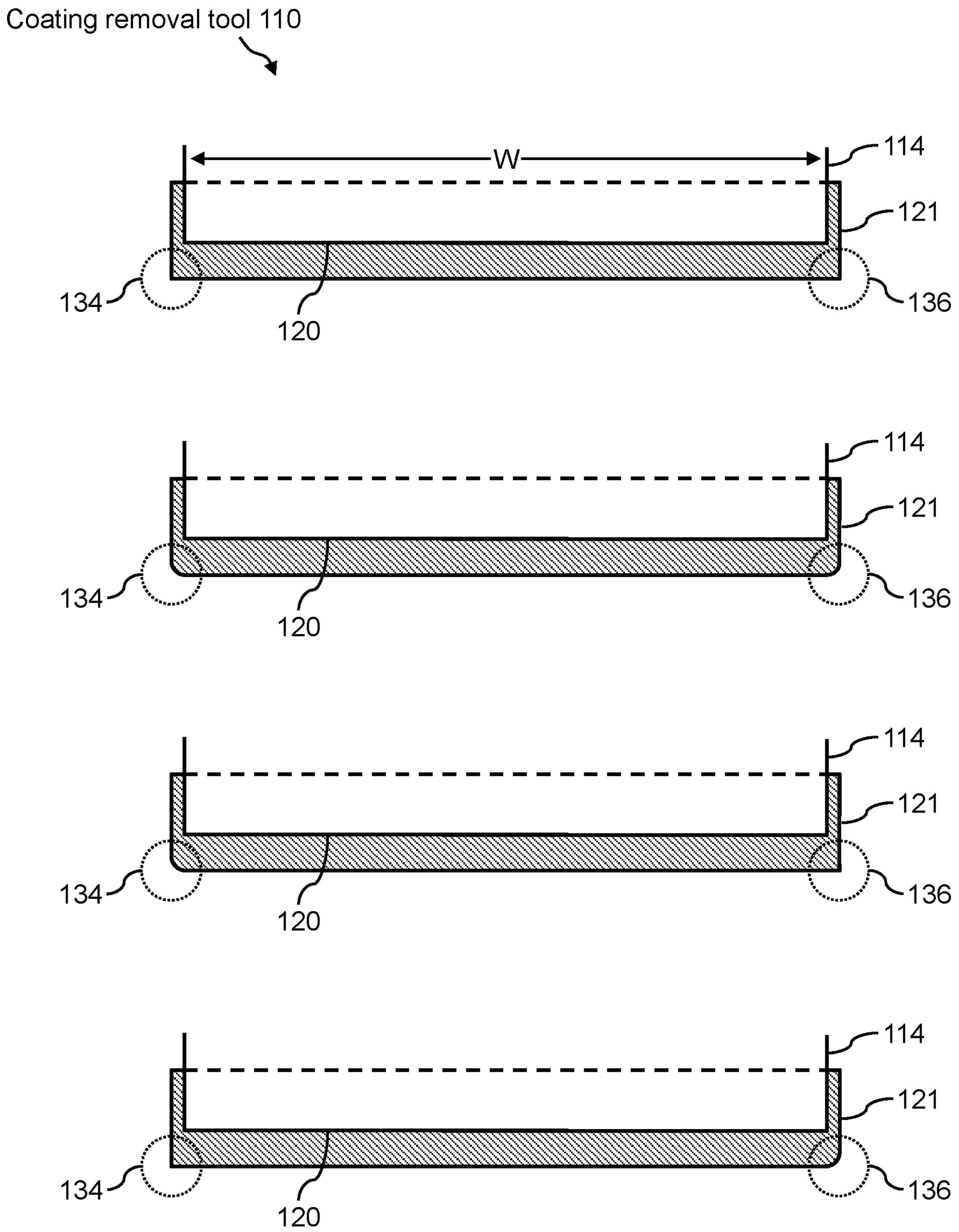
Figure 9:
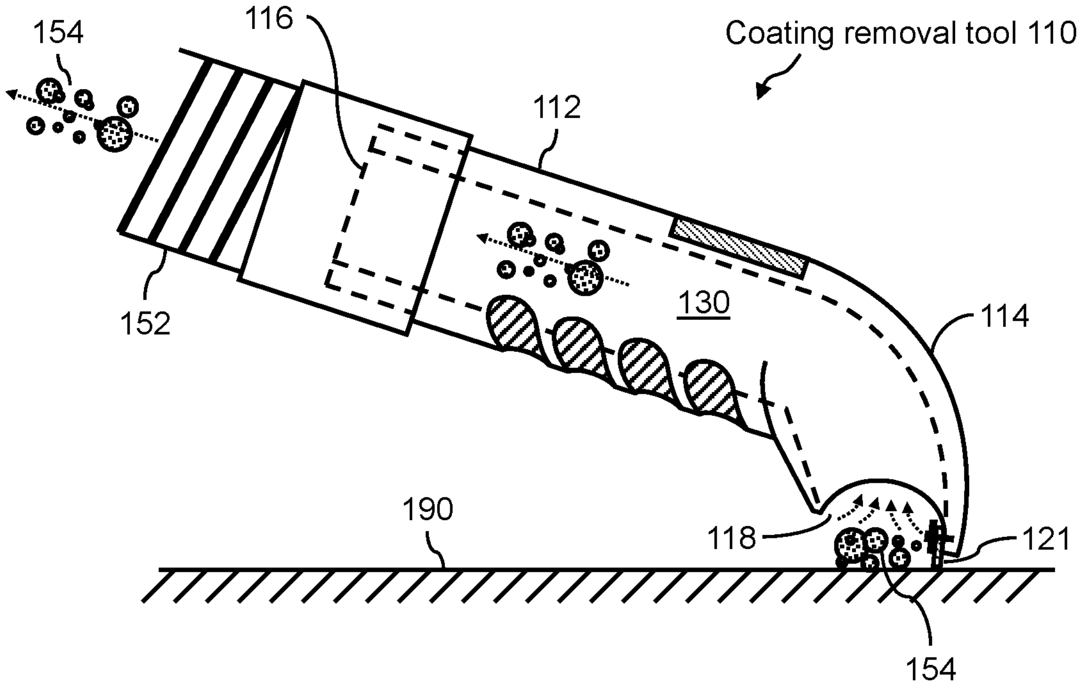
Figure 10:
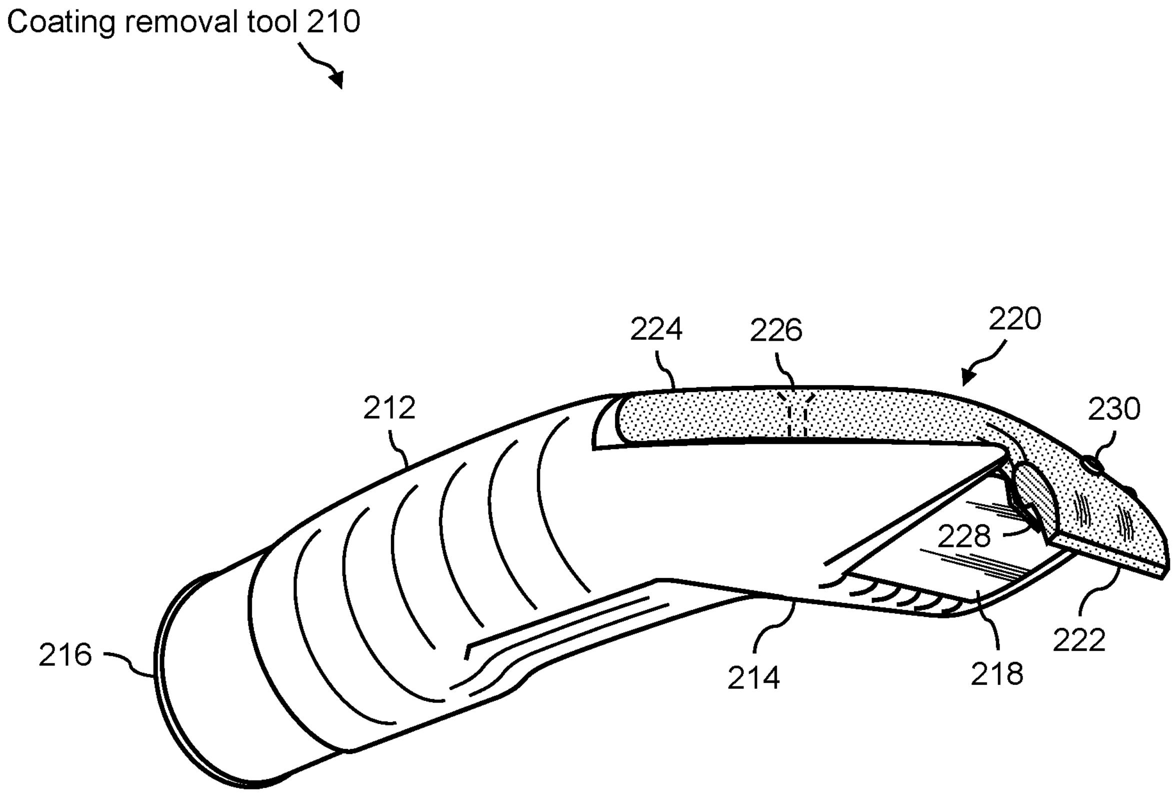
Figure 11:
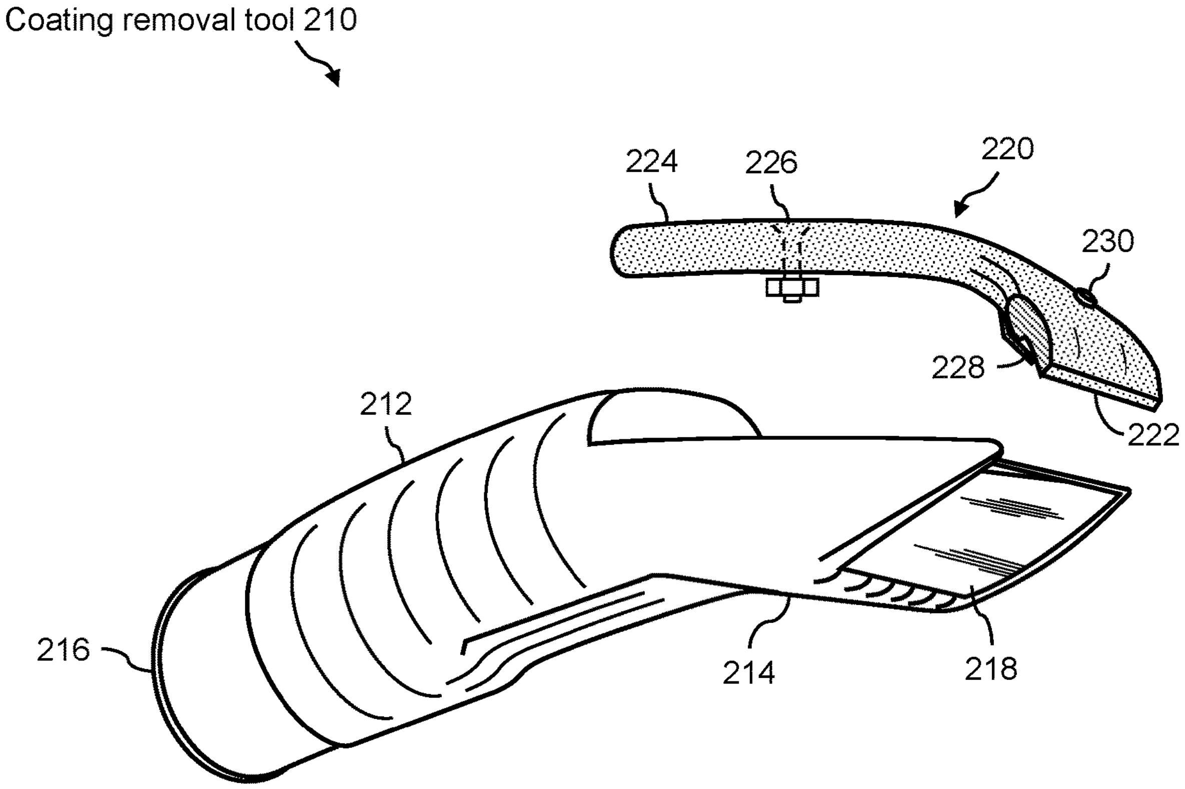
Figure 12:
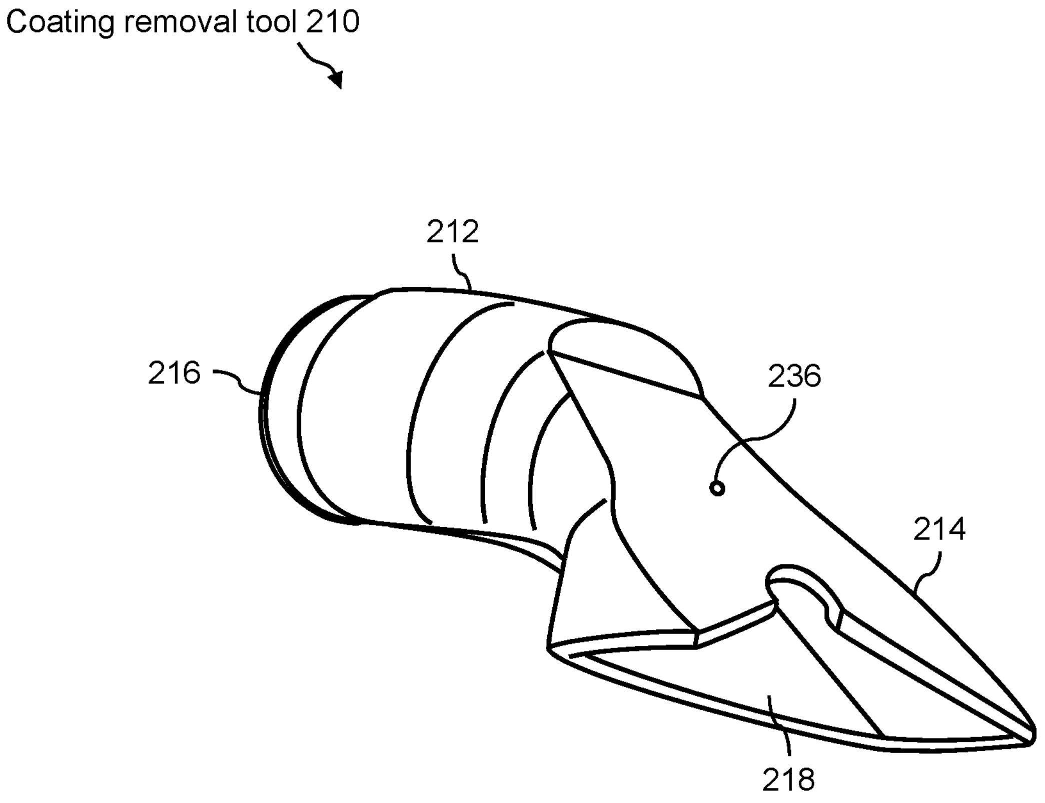
Figure 13:
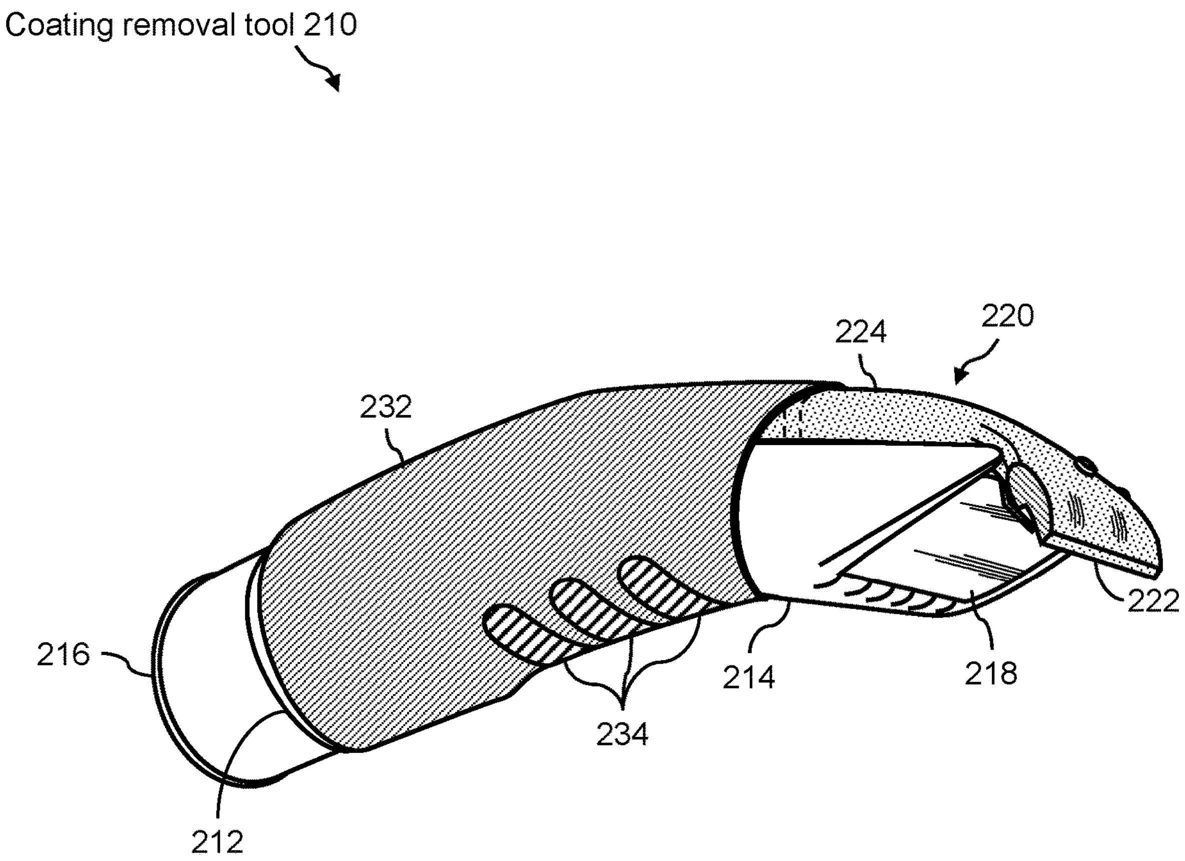
Figure 14:
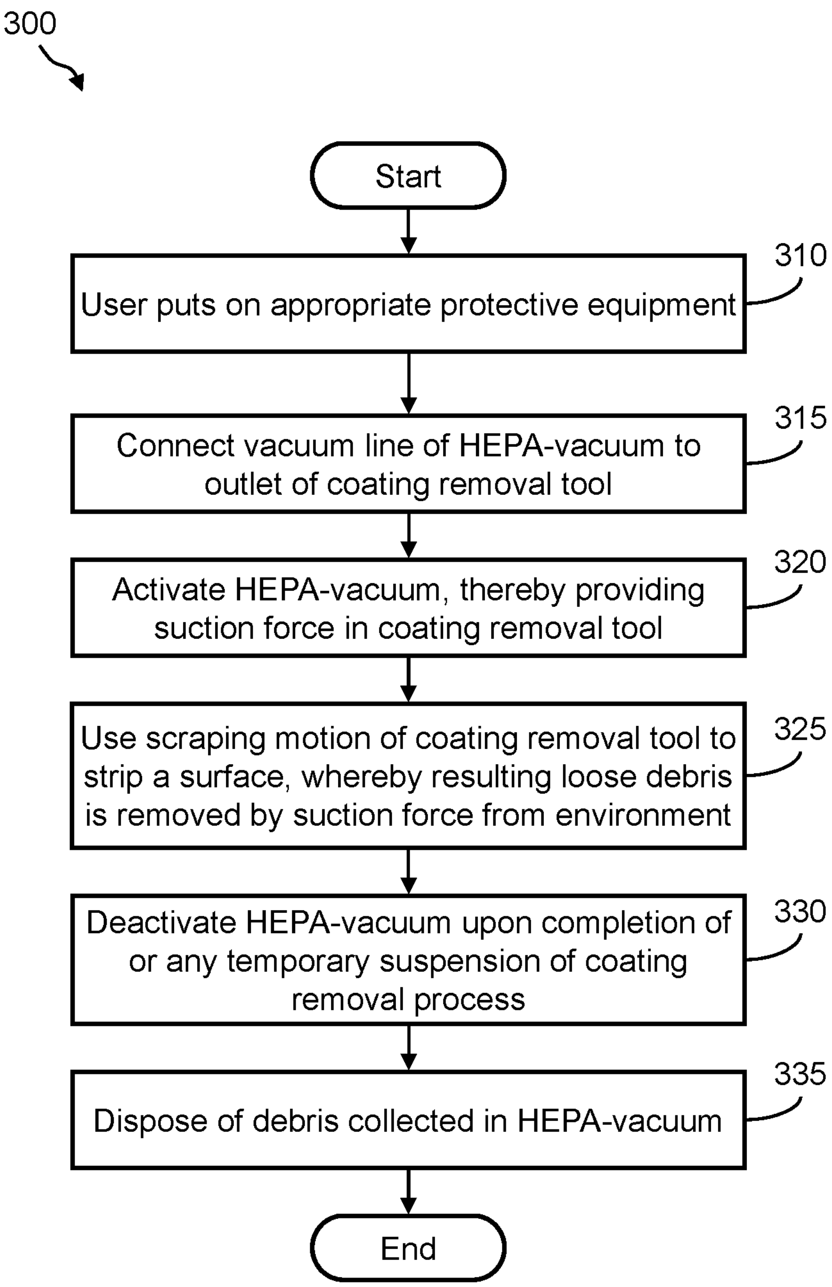
Figure 15:
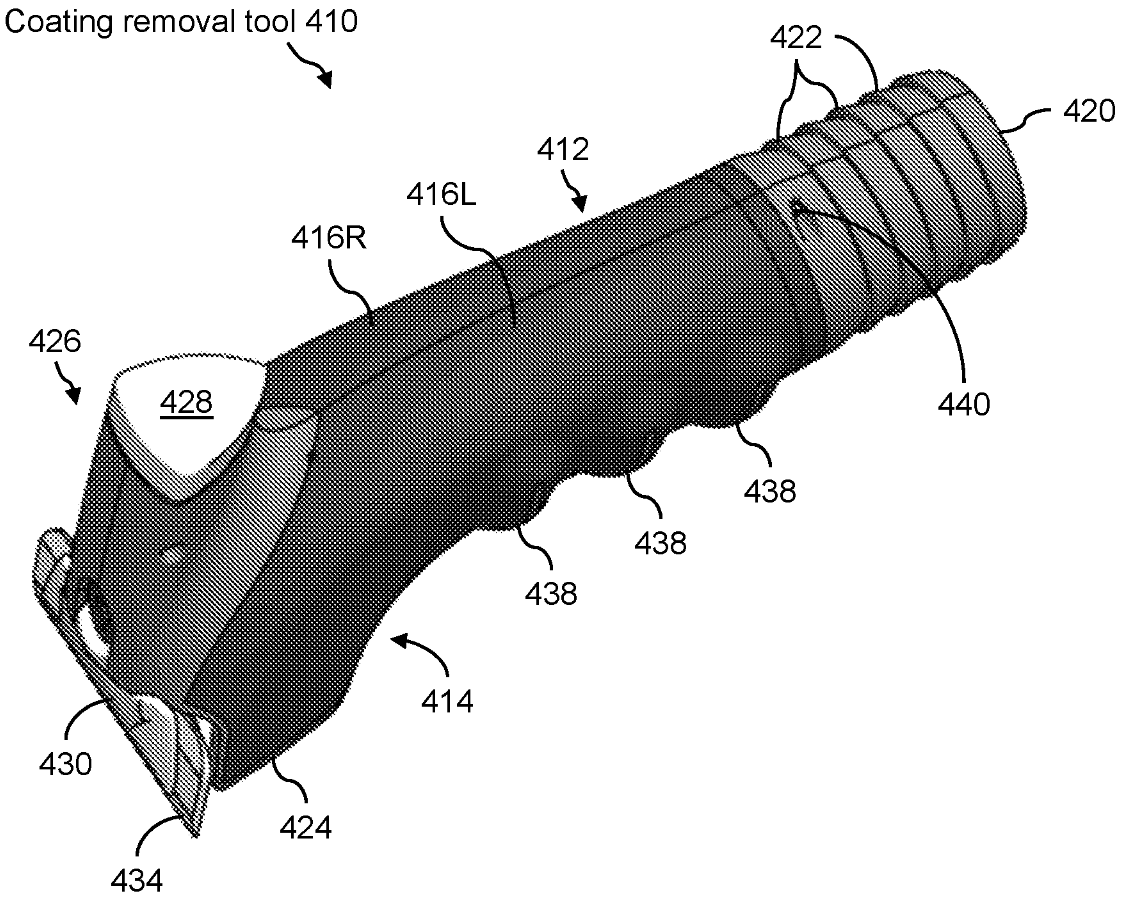
Figure 16:
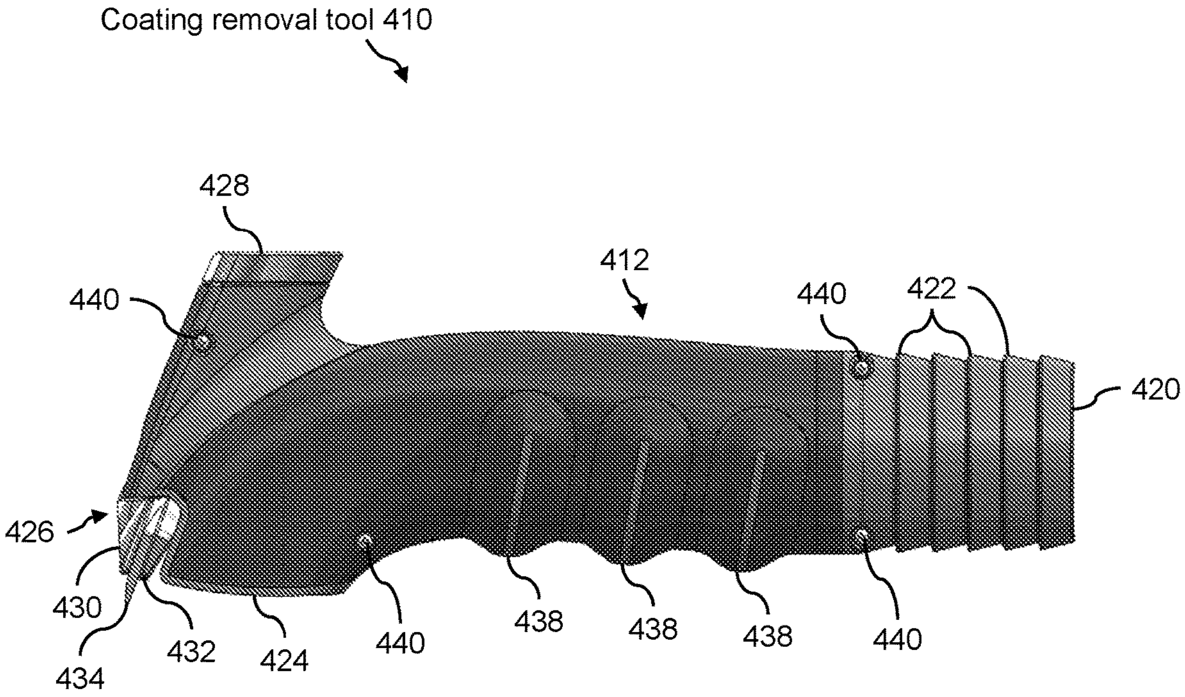
Figure 17:
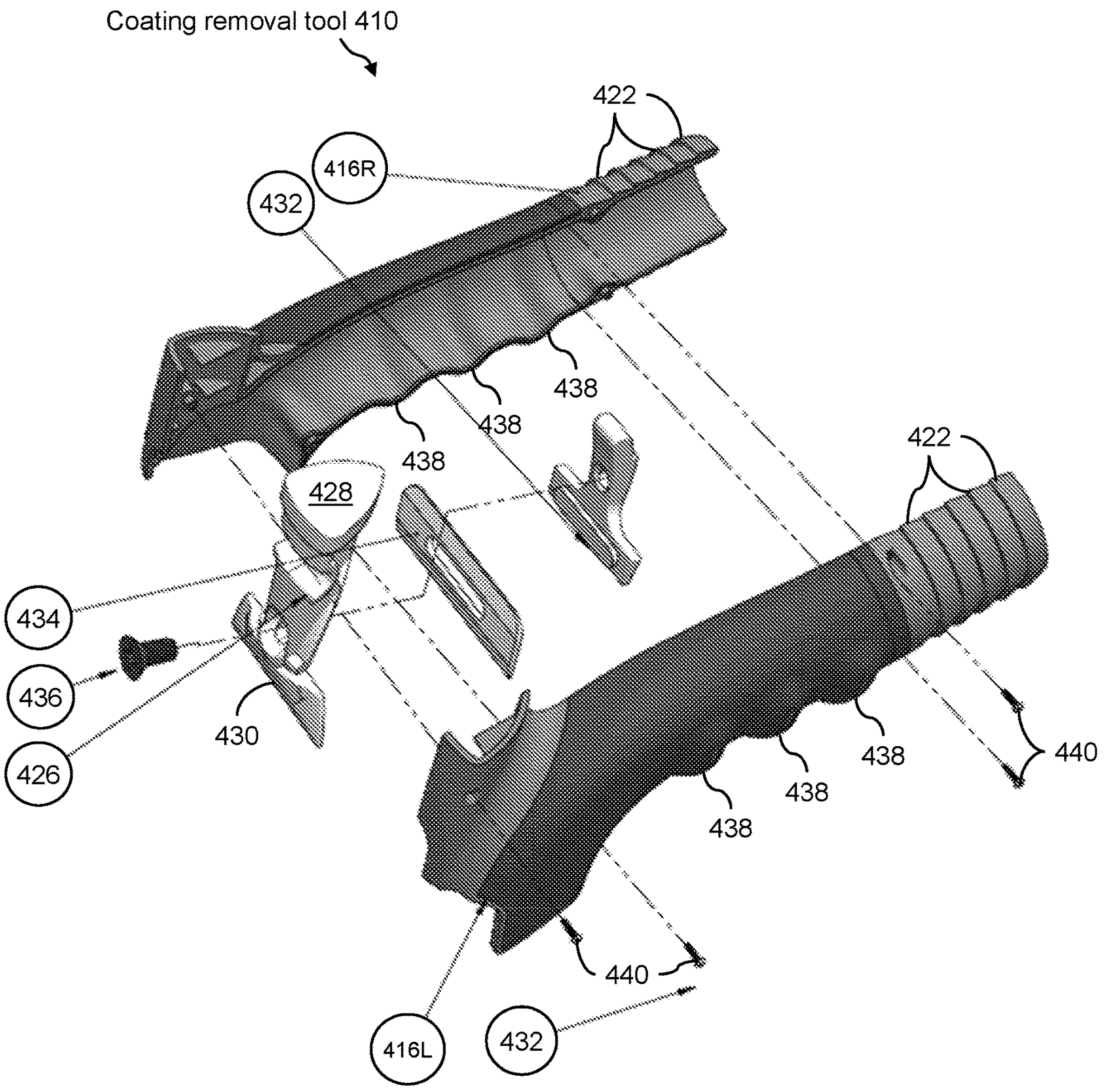

Having thus described the presently disclosed subject matter in general terms, reference will now be made to the accompanying Drawings, which are not necessarily drawn to scale, and wherein:

FIG. 1 illustrates a block diagram of an example of the presently disclosed HEPA-qualified coating removal system for the safe and effective removal of coatings from surfaces in, for example, building restoration/renovation/maintenance projects;

FIG. 2 illustrates a perspective view of an example of the presently disclosed coating removal tool for use in the HEPA-qualified coating removal system shown in FIG. 1;

FIG. 3A, FIG. 3B, and FIG. 3C illustrate a side view, a first end view, and a second end view, respectively, of the coating removal tool shown in FIG. 2;

FIG. 4A and FIG. 4B illustrate a top down view and bottom up view, respectively, of the coating removal tool shown in FIG. 2;

FIG. 5A illustrates a cross-sectional view of the coating removal tool taken along line A-A of FIG. 4A;

FIG. 5B illustrates a cross-sectional view of the coating removal tool taken along line B-B of FIG. 4A;

FIG. 6A and FIG. 6B illustrate other cross-sectional views of the coating removal tool, which show reinforcing members in the walls thereof;

FIG. 7A and FIG. 7B are side views of the scraper head portion of the coating removal tool and show examples of the side edge thereof;

FIG. 8 shows various examples of the blade of the coating removal tool shown in FIG. 2;

FIG. 9 illustrates a side view of an example of the coating removal tool when in use in the HEPA-qualified coating removal system shown in FIG. 1;

FIG. 10 illustrates a perspective view of another example of the presently disclosed coating removal tool for use in the HEPA-qualified coating removal system shown in FIG. 1;

FIG. 11 illustrates an exploded view of the coating removal tool shown in FIG. 10;

FIG. 12 illustrates a perspective view of the coating removal tool shown in FIG. 10 absent the blade;

FIG. 13 illustrates a perspective view of the coating removal tool shown in FIG. 10 that further includes a sleeve for improved grip and/or comfort;

FIG. 14 illustrates a flow diagram of an example of a method of using the presently disclosed HEPA-qualified coating removal system that includes the efficient coating removal tool;

FIG. 15, FIG. 16, and FIG. 17 illustrate a perspective view, a side view, and an exploded view, respectively, of yet another example of the presently disclosed coating removal tool for use in the HEPA-qualified coating removal system shown in FIG. 1;

FIG. 18 through FIG. 33 illustrate various views of the components of the coating removal tool shown in FIG. 15, FIG. 16, and FIG. 17; and FIG. 34, FIG. 35, FIG. 36, FIG. 37, FIG. 38, and FIG. 39 show tables of examples of test results for multiple samples at multiple work sites.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a HEPA-qualified coating removal system, coating removal tool, and method. Namely, the HEPA-qualified coating removal system includes a HEPA-vacuum coupled to a coating removal tool, wherein the coating removal tool is a scraper device that is optimized for removing coatings from surfaces effectively. Examples of coatings include, but are not limited to, asbestos, any types of paint including lead-based paint, crystalline silica (in latex paint), polychlorinated biphenyl (PCBs), mastics (i.e., construction adhesives), varnishes, and the like. Further, by coupling the scraper device to the HEPA-vacuum, the amount of airborne debris/dust generated during the scraping process is minimized.

In some embodiments, the presently disclosed HEPA-qualified coating removal system and method that includes the coating removal tool coupled to the HEPA-vacuum provides a mechanism wherein the amount of airborne debris/dust generated during the coating removal process is held to within safe levels that ensure respiratory protection of the user.

In some embodiments, the presently disclosed HEPA-qualified coating removal system and method that includes the coating removal tool coupled to the HEPA-vacuum provides a "dry" and "clean" surface restoration/renovation process, thereby avoiding damage to surfaces that conventional wetting/misting processes can cause and thereby allowing surfaces to be sealed or primed immediately upon completion of the coating removal process.

In some embodiments, the coating removal tool of the presently disclosed HEPA-qualified coating removal system provides a scraper head wherein the walls of the scraper head remain substantially spaced apart to form a large-area intake orifice. Accordingly, the presently disclosed coating removal tool is optimized to avoid clogging while at the same time providing suitable suction force to adequately remove debris/dust resulting from the coating disturbance, thereby minimizing airborne particulates.

In some embodiments, the coating removal tool of the presently disclosed HEPA-qualified coating removal system provides a scraper head that may include a set of different types of blades that can be switched in and out according to need.

In some embodiments, the coating removal tool of the presently disclosed HEPA-qualified coating removal system provides a scraper head that may include a built-in hammerhead for the convenience of the user. Accordingly, the presently disclosed coating removal tool can be both a coating removal tool and a hammer tool.

In some embodiments, the presently disclosed HEPA-qualified coating removal system and method that includes the coating removal tool coupled to the HEPA-vacuum reduces or entirely eliminates the need for sanding and can be used to "feather/smooth" out the transition from paint to wood. This feature is beneficial because sanding, unless controlled, can be an extremely high exposure activity and cause widespread contamination.

In some embodiments, the presently disclosed HEPA-qualified coating removal system and method that includes the coating removal tool coupled to the HEPA-vacuum includes a hammerhead may be integrated into the body of the coating removal tool. In yet other embodiments, gripping features and/or anti-slip features may be integrated into the body of the coating removal tool. In still other embodiments, reinforcing members may be integrated into the body of the coating removal tool.

Referring now to FIG. 1 is a block diagram of an example of the presently disclosed HEPA-qualified coating removal system 100 for the safe and effective removal of coatings from surfaces in, for example, building restoration/renovation projects. Namely, the presently disclosed HEPA-qualified coating removal system 100 can be used in a number of restoration/renovation applications. HEPA-qualified coating removal system 100 is especially well-suited for use in lead/asbestos abatement scenarios. However, HEPA-qualified coating removal system 100 is also well-suited for everyday use for removing any types of coatings on surfaces, such as wood or metal surfaces. Examples of coatings/materials that can be removed using HEPA-qualified coating removal system 100 include, but are not limited to, asbestos, any types of paint including lead-based paint, crystalline silica (in latex paint), PCBs, mastics (i.e., construction adhesives), varnishes, and the like.

HEPA-qualified coating removal system 100 includes a coating removal tool 105 and a HEPA-vacuum 150. A vacuum line 152 is connected between removal tool 105 and HEPA-vacuum 150. In this way, suction force is supplied to coating removal tool 105.

HEPA means high-efficiency particulate air. HEPA is a type of air filter. A HEPA filter must satisfy certain standards of efficiency, such as those set by the U.S. Department of Energy (DOE). To qualify as HEPA by U.S. government standards, an air filter must remove (from the air that passes through) 99.97% of particles that have a size of 0.3 μm. Accordingly, HEPA-vacuum 150 includes a HEPA filter (not shown). HEPA-vacuum 150 can be, for example, any commercially available HEPA vacuum. Examples of which include, but are not limited to, HEPA wet/dry vacuums available from Dustless® Technologies (Price, UT), HEPA wet/dry vacuums available from Vacmaster (Greenville, SC), HEPA wet/dry vacuums available from Nilfisk Industrial Vacuums (Morgantown, PA), the Super CoachVac® HEPA vacuums available from ProTeam, Inc. (Boise, ID), and the like.

Vacuum line 152 is, for example, a flexible, lightweight, rugged hose that is designed for toxic cleanup and not easily punctured. The length of vacuum line 152 can range from about 6 feet (1.83 m) to about 20 feet (6.1 m). In one example, the length of vacuum line 152 is about 8 feet (2.44 m). The inside diameter of vacuum line 152 can range from about 1.25 inches (3.17 cm) to about 2 inches (5.08 cm). In one example, the inside diameter of vacuum line 152 is about 1.5 inches (3.81 cm).

Coating removal tool 105 is a scraper device that is optimized for removing coatings from surfaces effectively. Suction force is applied to coating removal tool 105 via HEPA-vacuum 150 so that as the coating is scraped and the suction force removes any debris/dust (e.g., debris/dust 154) resulting from the coating disturbance, thereby ensuring that the amount of airborne particulates is at or below safe levels for respiratory protection. More details of examples of coating removal tool 105 are shown and described hereinbelow with reference to FIG. 2 through FIG. 14.

Examples of users of HEPA-qualified coating removal system 100 may include, but are not limited to, anyone who wishes to perform coating removal (particularly lead paint) in a safe manner for the person operating HEPA-qualified coating removal system 100 and for occupants of a building, and also anyone not wishing to disturb the integrity of a wood surface by wetting and misting, as HEPA-qualified coating removal system 100 provides a completely dry coating removal process. Other users of HEPA-qualified coating removal system 100 may include, but is not limited to, maintenance staffs of any entities, renovation/restoration contractors, painters, and homeowners.

Referring now to FIG. 2 is a perspective view of a coating removal tool 110, which is one example of a coating removal tool for use in the HEPA-qualified coating removal system 100 shown in FIG. 1. Namely, coating removal tool 110 is one example of the coating removal tool 105 of HEPA-qualified coating removal system 100 of FIG. 1. Also referring to FIG. 3A, FIG. 3B, and FIG. 3C, which is a side view, an outlet-end view, and a scraper-end view, respectively, of the coating removal tool 110 shown in FIG. 2; and also referring to FIG. 4A and FIG. 4B, which is a top down view and bottom up view, respectively, of the coating removal tool 110 shown in FIG. 2.

The body of coating removal tool 110 is comprised of two main elements: a scraper handle 112 and a scraper head 114, wherein scraper head 114 is arranged as shown with respect to one end of scraper handle 112. Namely, scraper handle 112 and scraper head 114 are hollow members that are integral or integrated together in one piece. In one embodiment, the scraper handle 112 and the scraper head 114 are a single, monolithic piece. The body of coating removal tool 110 (i.e., scraper handle 112 and scraper head 114) can be, for example, a single component formed of any lightweight, rigid, strong material, such as molded plastic or aluminum.

An outlet 116 is provided at the end of scraper handle 112 opposite scraper head 114. Outlet 116 of scraper handle 112 is sized and shaped to receive the end of vacuum line 152

(see FIG. 9). Scraper head 114 flares out from scraper handle 112 to an intake 118, which is a side-facing opening in scraper head 114. Namely, intake 118 is side-facing with respect to the center longitudinal axis (not shown) of scraper handle 112. Accordingly, a flow path 130 exists within coating removal tool 110 running from intake 118 of scraper head 114 to outlet 116 of scraper handle 112. Due to the suction force from HEPA-vacuum 150, the direction of flow is from intake 118 of scraper head 114 to outlet 116 of scraper handle 112 (again see FIG. 9).

In conventional vacuum-assisted scrapers, the walls of the scraper head converge to form a narrow small-area intake. By contrast, the presently disclosed coating removal tool 110 provides benefit over conventional vacuum-assisted scrapers because the walls of scraper head 114 do not converge. Rather, the walls remain substantially spaced apart to form a large-area intake 118.

Intake 118 of scraper head 114 has a leading edge 120 and two side edges 119. Leading edge 120 is straight across and is designed to hold a blade 121. Alignment features (not shown) may be built into leading edge 120 of intake 118 for positioning blade 121. Blade 121 is, for example, a flat, straight, metal blade (e.g., stainless steel or carbide blade) having an upper and lower leading edge, in which both upper and lower leading edges are sharp. Blade 121 is a substantially flat blade. Blade 121 is a consumable component of coating removal tool 110 that can be reversed to use the second edge, and replaced when no longer sharp or when damaged. In one example, a stabilizer member 126 and a fastener 128 are used to secure blade 121 at leading edge 120 of intake 118. Stabilizer member 126 can be a flat, straight, metal member, while fastener 128 can be a screw that is threaded into a screw receptacle in the wall of intake 118 or passes through the wall of intake 118 and is fastened with a nut (not shown). In one example, the blade 121 is between the stabilizer member 126 and the wall of the intake 118 when secured by a single fastener to the leading edge 120. Different types of blades 121 can be provided with coating removal tool 110. Examples of which are shown and described hereinbelow with reference to FIG. 8.

The two side edges 119 of intake 118 may be arch-shaped or have any other shape to further enlarge the opening of intake 118. More examples of side edge 119 are shown and described with reference to FIG. 7A and FIG. 7B.

In some embodiments, a hammerhead 122 is integrated into scraper handle 112 of coating removal tool 110. Hammerhead 122 can be used for hammering nail heads that may be protruding from the surface being prepared. Hammerhead 122 can be a metal plate that is shaped to correspond to the contour of scraper handle 112 (see FIG. 5B). Hammerhead 122 can press-fitted into a cavity in the wall of scraper handle 112 or held in the cavity by any type of fastener or adhesive. In one embodiment, the hammerhead 122 is flush with the wall of scraper handle 112. The plan view shape of hammerhead 122 can be, for example, circular, ovular, square, rectangular, and the like. Coating removal tool 110 with hammerhead 122 is one example in which the presently disclosed coating removal tool can be both a coating removal tool and a hammer tool for the convenience of the user.

In other embodiments, one or more gripping features 124, such as ergonometric grooves, are integrated into scraper handle 112 of coating removal tool 110. Gripping features 124 can be angled or straight across scraper handle 112. Further, gripping features 124 can be tailored for right handed users vs. left handed users.

Referring now to FIG. 5A is a cross-sectional view of coating removal tool 110 taken along line A-A of FIG. 4A. The walls of coating removal tool 110 have a thickness T. The thickness T can be uniform throughout the entirety of coating removal tool 110 or the thickness T can vary throughout coating removal tool 110. The thickness T should be suitably large to withstand pressure that is applied to coating removal tool 110 when in use. Accordingly, the thickness T can range from about 0.125 inches (0.32 cm) to about 0.25 inches (0.64 cm). In one example, the thickness T is about 0.125 inches (0.32 cm) at intake 118 and tapers out to about 0.25 inches (0.64 cm) where hammerhead 122 is installed. Coating removal tool 110 has an overall length L. The length L can range from about 6 inches (15.24 cm) to about 8 inches (20.32 cm). In one example, the overall length L of coating removal tool 110 is about 8 inches (20.32 cm). Further, after slipping vacuum line 152 over the outlet 116 of coating removal tool 110, the remaining visible portion of coating removal tool 110 can be, for example, about 6.5 inches (16.51 cm) long.

Outlet 116 of scraper handle 112 may be defined by a step in the cross-sectional profile of the walls of coating removal tool 110. Outlet 116 has an outside diameter D and an inside diameter d. The outside diameter D of outlet 116 corresponds to the inside diameter of vacuum line 152. Accordingly, the outside diameter D of outlet 116 can range from about 1.25 inches (3.17 cm) to about 2 inches (5.08 cm). In one example, the outside diameter D of outlet 116 is about 1.5 inches (3.81 cm) and the inside diameter d of outlet 116 is about 1.25 inches (3.17 cm).

Referring now to FIG. 5B is a cross-sectional view of coating removal tool 110 taken along line B-B of FIG. 4A. This view shows an example of hammerhead 122 that is shaped to correspond to the curve in scraper handle 112 so that the outer surface of the hammerhead 122 is about flush with the outer surface of scraper handle 112.

Referring now to FIG. 6A and FIG. 6B is other cross-sectional views of coating removal tool 110, which show reinforcing members in the walls thereof. For example, one or more reinforcing members 132 may be embedded into the walls of scraper handle 112 of coating removal tool 110. The one or more reinforcing members 132 can be elongated members that run along the length of scraper handle 112. The one or more reinforcing members 132 can be, for example, metal rods, bars, and/or plates. Further, the one or more reinforcing members 132 can extend into the walls of scraper head 114.

Referring now to FIG. 7A and FIG. 7B are side views of the scraper head 114-portion of coating removal tool 110 and show more examples of side edge 119 of scraper head 114. FIG. 7A shows the arch-shaped side edge 119, wherein the height or depth of the arch-shaped side edge 119 can vary from a large arch to no arch at all. In another example, FIG. 7B shows a squared off side edge 119, wherein side edge 119 is squared off toward the inner or upper edge of blade 121.

Optionally, a flange or flap piece (not shown) can be integrated into the side wall of scraper head 114, near side edge 120. In another example, the flange or flap piece can be provided separately and snap-fitted or otherwise fastened to or near side edge 120 of scraper head 114. This flange or flap piece is designed to collect and catch any debris that may disperse outwardly from scraper head 114.

Referring now to FIG. 8 is various examples of blade 121 of coating removal tool 110 shown in FIG. 2. The leading edge of scraper head 114 of coating removal tool 110 has a width W. The width W can range from about 2 inches (5.08 cm) to about 3 inches (7.62 cm). In one example, the width W of the leading edge of scraper head 114 is about 2.5 inches (6.35 cm).

The length of blade 121 can be the same as or different than the width W of the leading edge of scraper head 114. In one example, the length of blade 121 is about the same as width W. In another example, the length of blade 121 is slightly less than the width W. In yet another example, the length of blade 121 is slightly greater than the width W.

A set of blades 121 may be provided with coating removal tool 110, wherein different blades 121 have different features. The different blades 121 can be switched in and out of scraper head 114 according to need. For example, FIG. 8 shows that blade 121 has a first leading corner 134 and a second leading corner 136. In one example, both the first leading corner 134 and second leading corner 136 are squared off. In another example, both the first leading corner 134 and second leading corner 136 are rounded. In yet another example, first leading corner 134 is rounded while second leading corner 136 is squared off. In still another example, first leading corner 134 is squared off while second leading corner 136 is rounded. The rounded corners of blade 121 are provided, for example, to reduce or completely eliminate gouging or marring that may occur while scraping a surface.

Referring now to FIG. 9 is a side view of an example of coating removal tool 110 when in use in the HEPA-qualified coating removal system 100 shown in FIG. 1. Namely, FIG. 9 shows an example of using coating removal tool 110 to remove coatings from a surface 190, wherein surface 190 may be a wood and/or metal surface. There may be one or multiple coatings on surface 190 that can include, for example, asbestos, one or more layers of paint including lead-based paint, crystalline silica (in latex paint), PCBs, mastics (i.e., construction adhesives), varnishes, and the like.

When in use, HEPA-vacuum 150 is activated and then the coating removal process (i.e., the scraping process) begins. As debris/dust 154 is generated, the debris/dust 154 is pulled into intake 118 of scraper head 114 due to the suction force from HEPA-vacuum 150. Accordingly, the direction of flow through flow path 130 of coating removal tool 110 is from intake 118 of scraper head 114 to outlet 116 of scraper handle 112.

The size and shape of intake 118 of scraper head 114 and/or the size and shape of flow path 130 through scraper handle 112 are optimized to avoid clogging while at the same time providing suitable suction force to adequately remove debris/dust 154 resulting from the coating disturbance, thereby minimizing airborne particulates. In one example, the opening that forms intake 118 is about 2 inches (5.08 cm) wide by about 1.25 inches (3.17 cm) deep.

Referring now to FIG. 10 is a perspective view of a coating removal tool 210, which is another example of a coating removal tool for use in HEPA-qualified coating removal system 100 shown in FIG. 1. Namely, coating removal tool 210 is another example of coating removal tool 105 of HEPA-qualified coating removal system 100 of FIG. 1. Further, FIG. 11 shows an exploded view of coating removal tool 210 shown in FIG. 10.

The body of coating removal tool 210 is comprised of two main elements: a scraper handle 212 and a scraper head 214, wherein scraper head 214 is arranged with respect to one end of scraper handle 212 as shown. Scraper handle 212 and scraper head 214 are hollow members that are integral or integrated together in one piece. The body of coating removal tool 210 (i.e., scraper handle 212 and scraper head 214) can be, for example, a single component formed of any lightweight, rigid, strong material, such as molded plastic or aluminum.

An outlet 216 is provided at the end of scraper handle 212 opposite scraper head 214. Outlet 216 of scraper handle 212 is sized and shaped to receive the end of vacuum line 152. Scraper head 214 flares out from scraper handle 212 to an intake 218, which is a side-facing opening in scraper head 214. Accordingly, a flow path exists within coating removal tool 210 running from intake 218 of scraper head 214 to outlet 216 of scraper handle 212.

In conventional vacuum-assisted scrapers, the walls of the scraper head converge to form a narrow small-area intake. By contrast, the presently disclosed coating removal tool 210 provides benefit over conventional vacuum-assisted scrapers because the walls of scraper head 214 do not converge. Rather, the walls remain substantially spaced apart to form a large-area intake 218.

Coating removal tool 210 is substantially the same as coating removal tool 110 described in FIG. 2 through 9 except for how the blade is implemented. Rather than attaching a simple straight blade on the leading edge of the intake, a blade with a handle is affixed atop scraper handle 212. For example, FIG. 10 and FIG. 11 show a handheld scraper 220 affixed to the top of scraper handle 212. Handheld scraper 220 includes a blade portion 222 and a handle portion 224. Handle portion 224 of handheld scraper 220 can be fastened to a flattened surface (see FIG. 12) at the top of scraper head 214 such that blade portion 222 is positioned at intake 218 of scraper head 214. Handheld scraper 220 can be, for example, a commercially available carbide paint or glue scraper or a modified version thereof. In one example, handheld scraper 220 is the "Bahco 650 Carbide Edged Power Scraper" in which the handle thereof has been modified to fit atop and be fastened to coating removal tool 210. For example, the handle has been modified to be fastened to coating removal tool 210 via a screw or bolt 226. Associated with blade portion 222 is stabilizer member 228 that is held via a fastener 230.

Referring now to FIG. 12 is a perspective view of coating removal tool 210 shown in FIG. 10 but absent handheld scraper 220. This view shows that the top portion of scraper head 214 is flattened and includes a V-cut portion that allows handheld scraper 220 to be fitted properly into scraper head 214.

Referring now to FIG. 13 is a perspective view of coating removal tool 210 shown in FIG. 10 that further includes a sleeve 232 for improved grip and/or comfort. Sleeve 232 can be formed of any stretchable, flexible, durable, washable material that can be fitted over coating removal tool 210. Further, a set of gripping features 234 can be integrated into sleeve 232. In similar fashion, coating removal tool 110 that is described with reference to FIG. 2 through 9 can also include sleeve 232.

Referring now to FIG. 14 is a flow diagram of an example of a method 300 of using the presently disclosed HEPA-qualified coating removal system 100 that includes the efficient coating removal tool. By way of example, coating removal tool 110 that is described with reference to FIG. 2 through 9 is used in method 300. Method 300 includes, but is not limited to, the following steps.

At a step 310, the user of HEPA-qualified coating removal system 100 applies protective gear, such as by putting on appropriate protective equipment, such as, but not limited to, protective clothing, goggles, respiratory protection, gloves. Examples of respiratory protection include, but are not limited to, standard dust masks, dust masks with exhalation valves, and negative pressure half face respirators.

At a step 315, vacuum line 152 from HEPA-vacuum 150 is connected to outlet 116 of coating removal tool 110 as shown, for example, in FIG. 9.

At a step 320, HEPA-vacuum 150 is activated. That is, HEPA-vacuum 150 is activated by turned it on, and suction force is provided in coating removal tool 110.

At a step 325, the user places blade 121 on the target surface and applies pressure to coating removal tool 110, then the user imparts a scraping motion to coating removal tool 110 in order to strip the target surface. All the while, the resulting loose debris/dust 154 is removed via suction force from the environment. Namely, using coating removal tool 110, the user performs scraping action upon the target surface, as shown, for example, in FIG. 9. All the while, loose debris (e.g., debris/dust 154) is pulled through intake 118 of coating removal tool 110, through flow path 130 of coating removal tool 110, through vacuum line 152, and into the storage canister/bag of HEPA-vacuum 150. In this way, debris/dust 154 is removed from the environment and collected in HEPA-vacuum 150.

At a step 330, upon completion or any temporary suspension of the coating removal process, HEPA-vacuum 150 is deactivate (turned off).

At a step 335, debris/dust 154 that is collected in HEPA-vacuum 150 is disposed of in the appropriate required manner.

Referring now to FIG. 15, FIG. 16, and FIG. 17 is a perspective view, a side view, and an exploded view, respectively, of a coating removal tool 410, which is another example of a coating removal tool for use in HEPA-qualified coating removal system 100 shown in FIG. 1. Namely, coating removal tool 410 is another example of coating removal tool 105 of HEPA-qualified coating removal system 100 of FIG. 1.

The body of coating removal tool 410 is comprised of two main elements: a scraper handle 412 and a scraper head 414, wherein scraper head 414 is arranged with respect to one end of scraper handle 412 as shown. Scraper handle 412 and scraper head 414 are formed by a pair of body sides to form a single hollow member. For example, coating removal tool 410 is formed by a body right side 416R and a body left side 416L. Body right side 416R and body left side 416L can be formed of any lightweight, rigid, strong material, such as molded plastic or aluminum. In one example, body right side 416R and body left side 416L are held together via a connector, including by a fastener, and adhesive, or coupling members. In one example, the connector includes one or more screws 440. In another example, body right side 416R and body left side 416L may be held together via an adhesive (not shown). In yet another example, body right side 416R and body left side 416L are designed to be snap-fitted together. In still another example, body of coating removal tool 410 (i.e., scraper handle 412 and scraper head 414) can be, for example, a single component (not right side and left side halves fitted together) formed of any lightweight, rigid, strong material, such as molded plastic or aluminum.

Further, at scraper handle 412, the upper wall portion of both body right side 416R and body left side 416L has additional thickness in order to provide suitable strength to handle the downward pressure during use. This thicker wall portion of body right side 416R and body left side 416L is hereafter called an overmold 418 of scraper handle 412. For example, if the nominal wall thickness of body right side 416R and body left side 416L is about 0.05 inches (1.27 mm), then overmold 418 adds another about 0.05 inches (1.27 mm) of thickness.

An outlet 420 is provided at the end of scraper handle 412 opposite scraper head 414. Outlet 420 of scraper handle 412 is sized and shaped to receive the end of a vacuum line, such as vacuum line 152 shown in FIG. 9. Further, a set of ridges 422 may be provided on the outer surface of the outlet 420. Ridges 422 are useful for securing the vacuum line to the outlet 420. Scraper head 414 flares out from scraper handle 412 to an intake 424, which is a downward-facing opening in scraper head 414. Accordingly, a flow path exists within coating removal tool 410 running from intake 424 of scraper head 414 to outlet 420 of scraper handle 412. Further, one or more gripping features 438 may be integrated into scraper handle 412 of coating removal tool 410. Gripping features 438 can be tailored for right handed users vs. left handed users.

In conventional vacuum-assisted scrapers, the walls of the scraper head converge to form a narrow small-area intake. By contrast, the presently disclosed coating removal tool 410 provides benefit over conventional vacuum-assisted scrapers because the walls of scraper head 414 do not converge. Rather, the walls remain substantially spaced apart to form a large-area intake 424.

Coating removal tool 410 is substantially the same as coating removal tool 110 described in FIG. 4 through 9 except for how the blade and the hammerhead is implemented. Namely, coating removal tool 410 includes a vertical member 426 that is integrated into scraper head 414. Referring now to FIG. 17, a hammerhead 428 is arranged on the upper end of vertical member 426. A blade support plate 430 is arranged at the lower end of vertical member 426. A separate blade clamp 432 is provided on the rearward side of blade support plate 430, wherein a blade 434 can be secured between blade support plate 430 and blade clamp 432 via a machine screw 436. Blade 434 may contain and oval-shaped hole, which fits with an oval-shaped "ridge" on blade clamp 432. This feature would be to align the blade, hold it firmly in position, and facilitate quick blade changes. In other words, when you back off screw 436, the blade will drop out and new blade can be installed. Additionally, screw 436 might instead may be a quick release attachment such as, for example, a cammed knob that you can twist by hand to facilitate easy blade changes. Blade 434 is a substantially flat blade. Coating removal tool 410 with its vertical member 426 and hammerhead 428 is another example in which the presently disclosed coating removal tool can be both a coating removal tool and a hammer tool for the convenience of the user.

Figure 18:
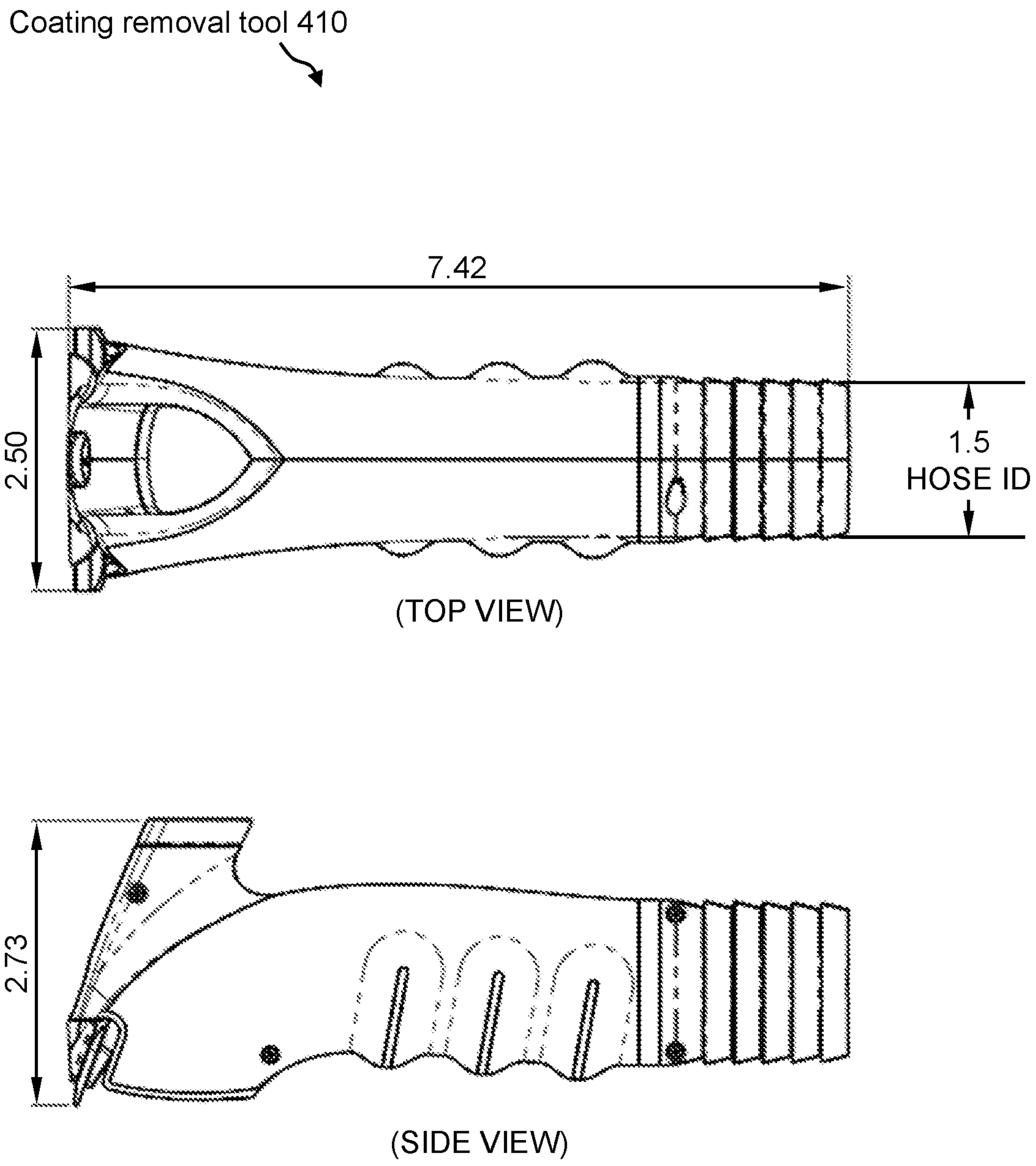
Figure 19:
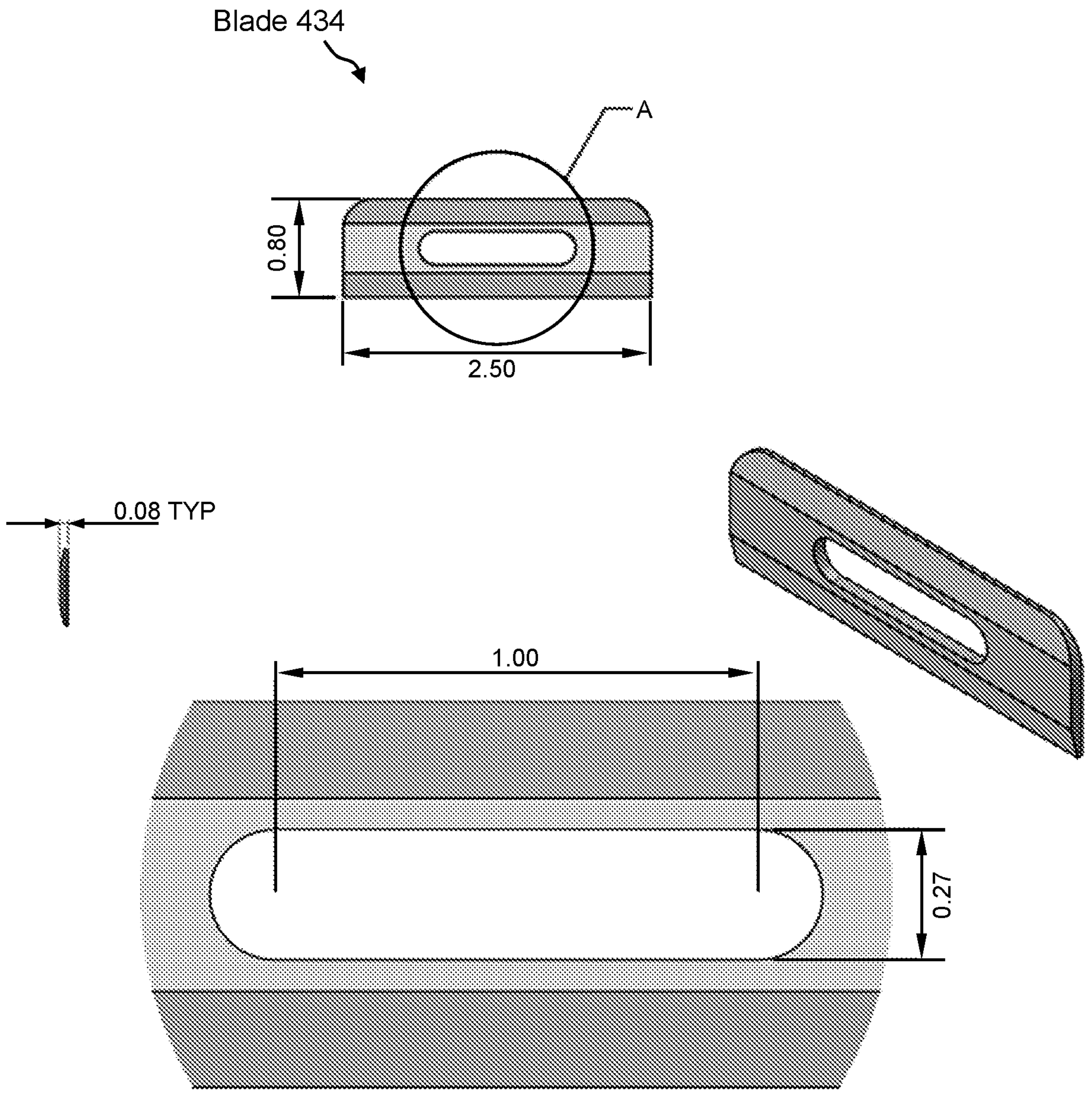
Figure 20:
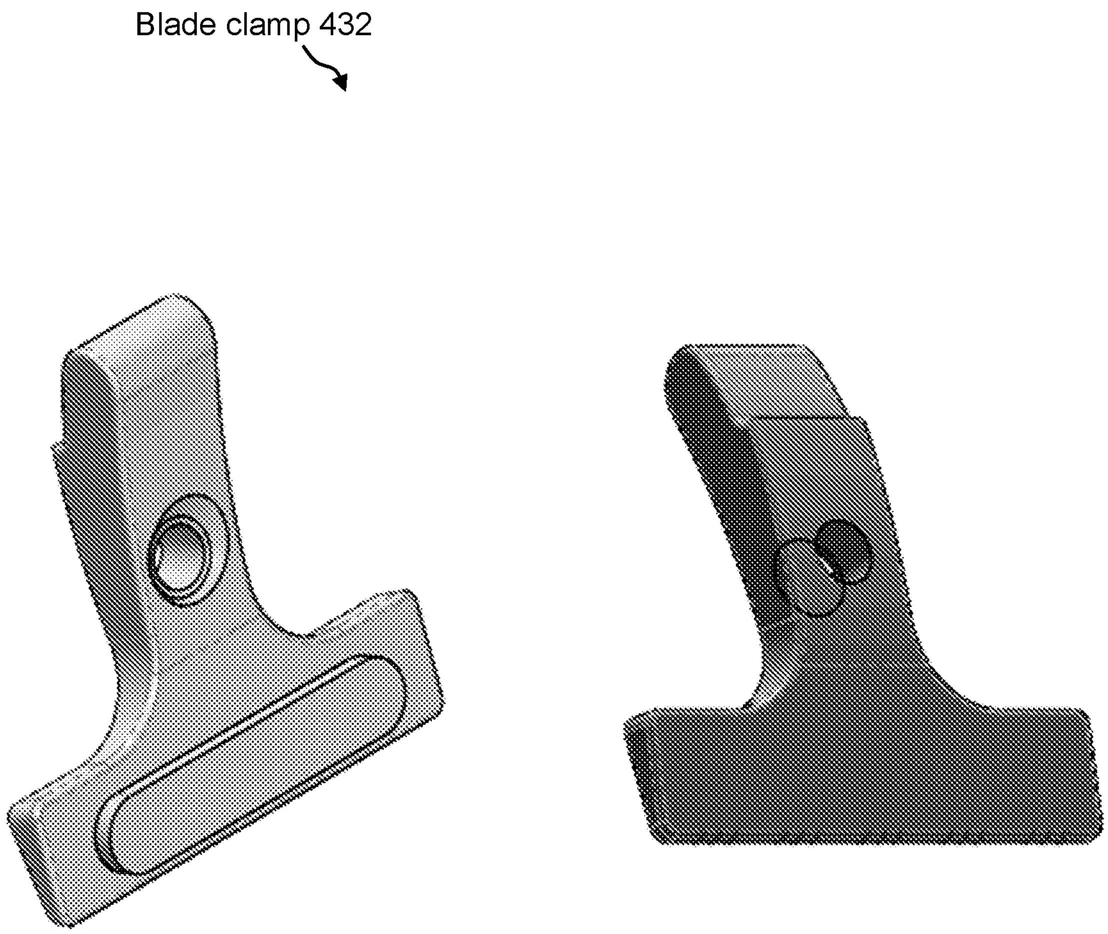
Figure 21:
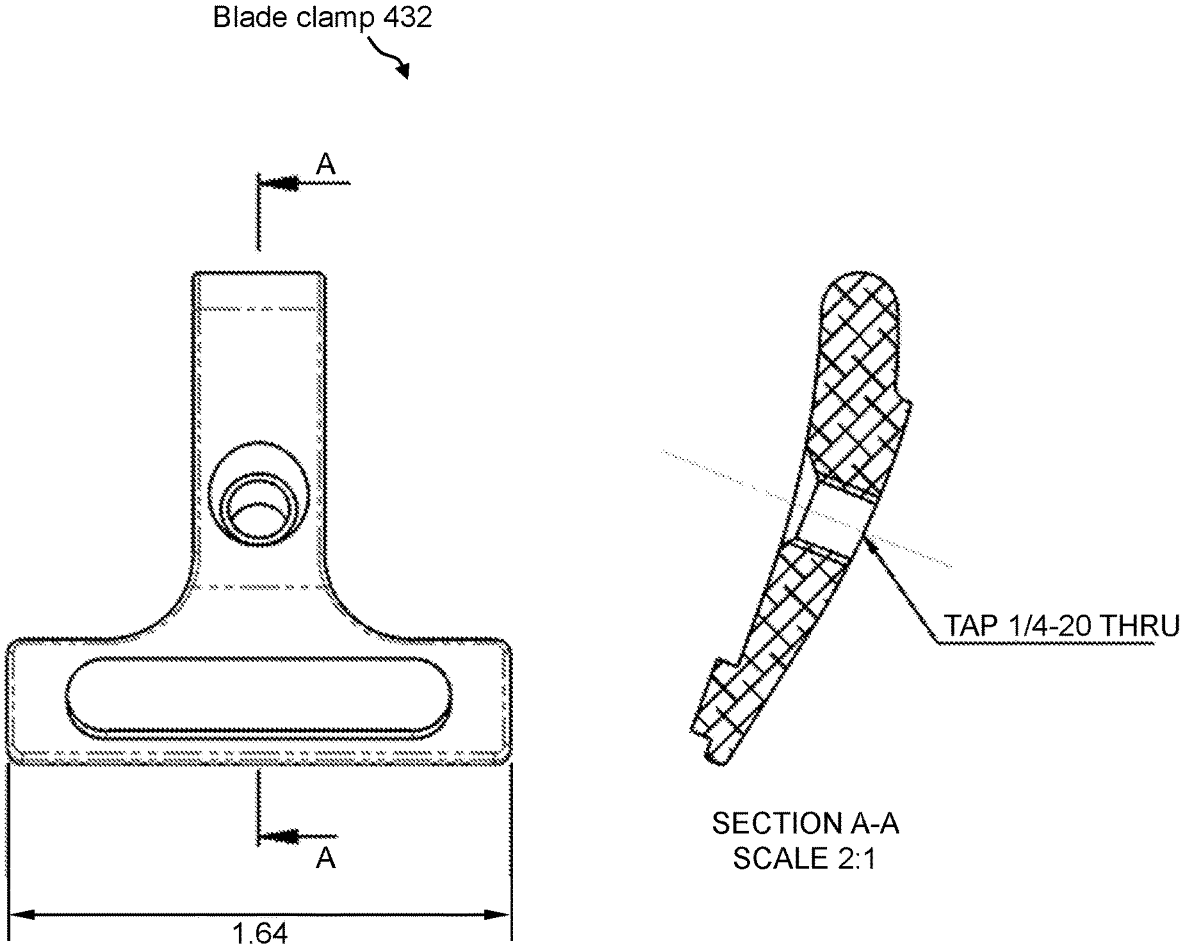
Figure 22:
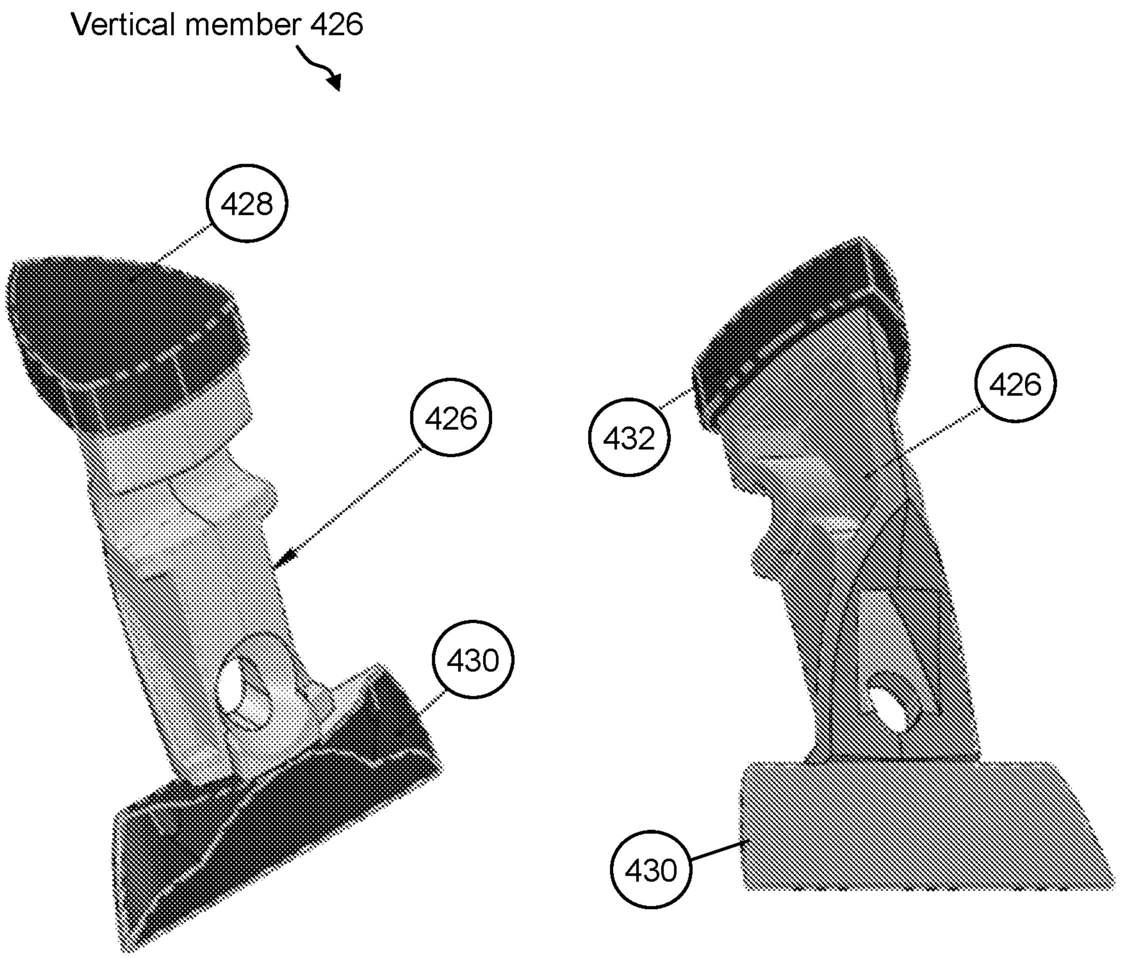
Figure 23:
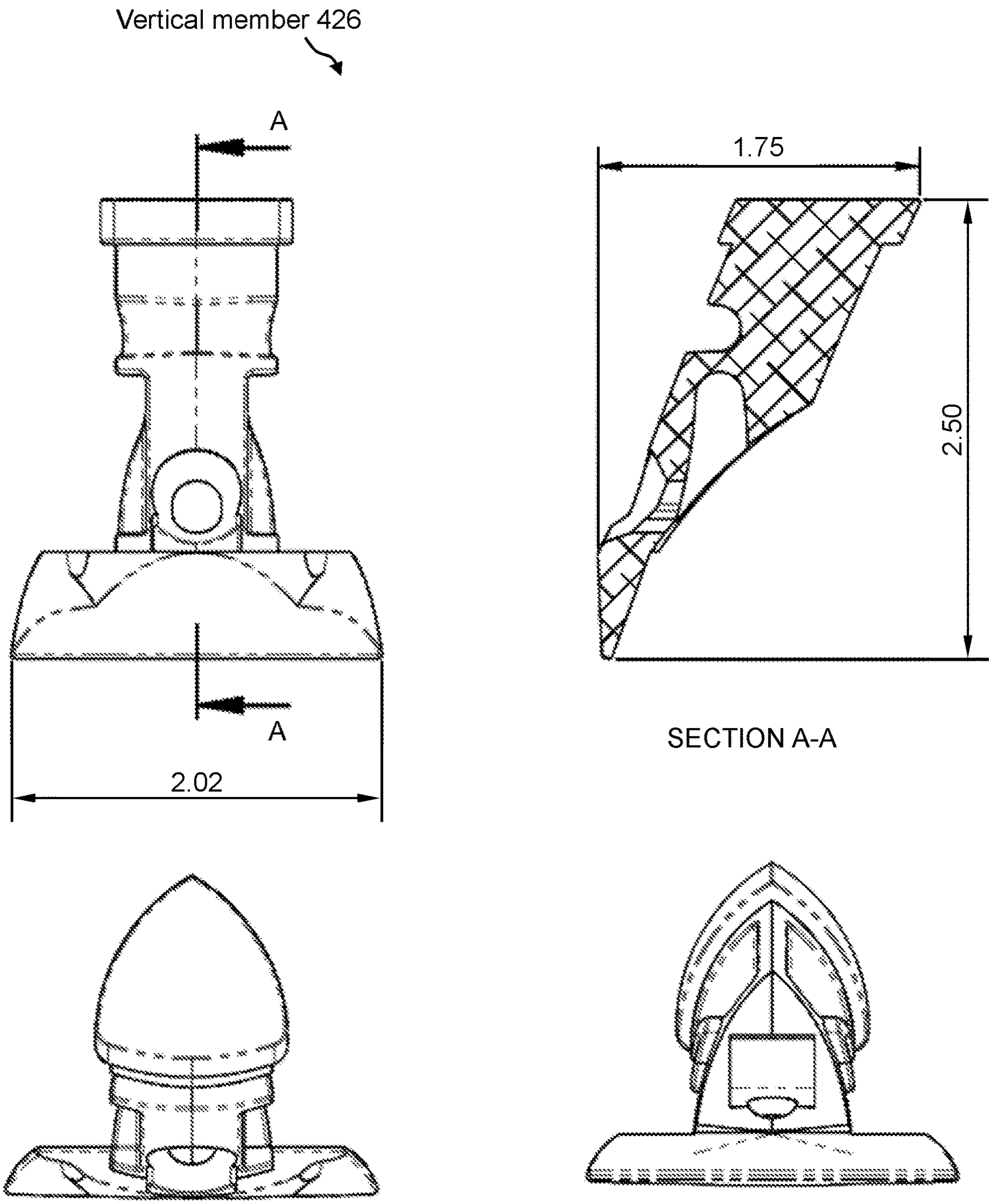
Figure 24:
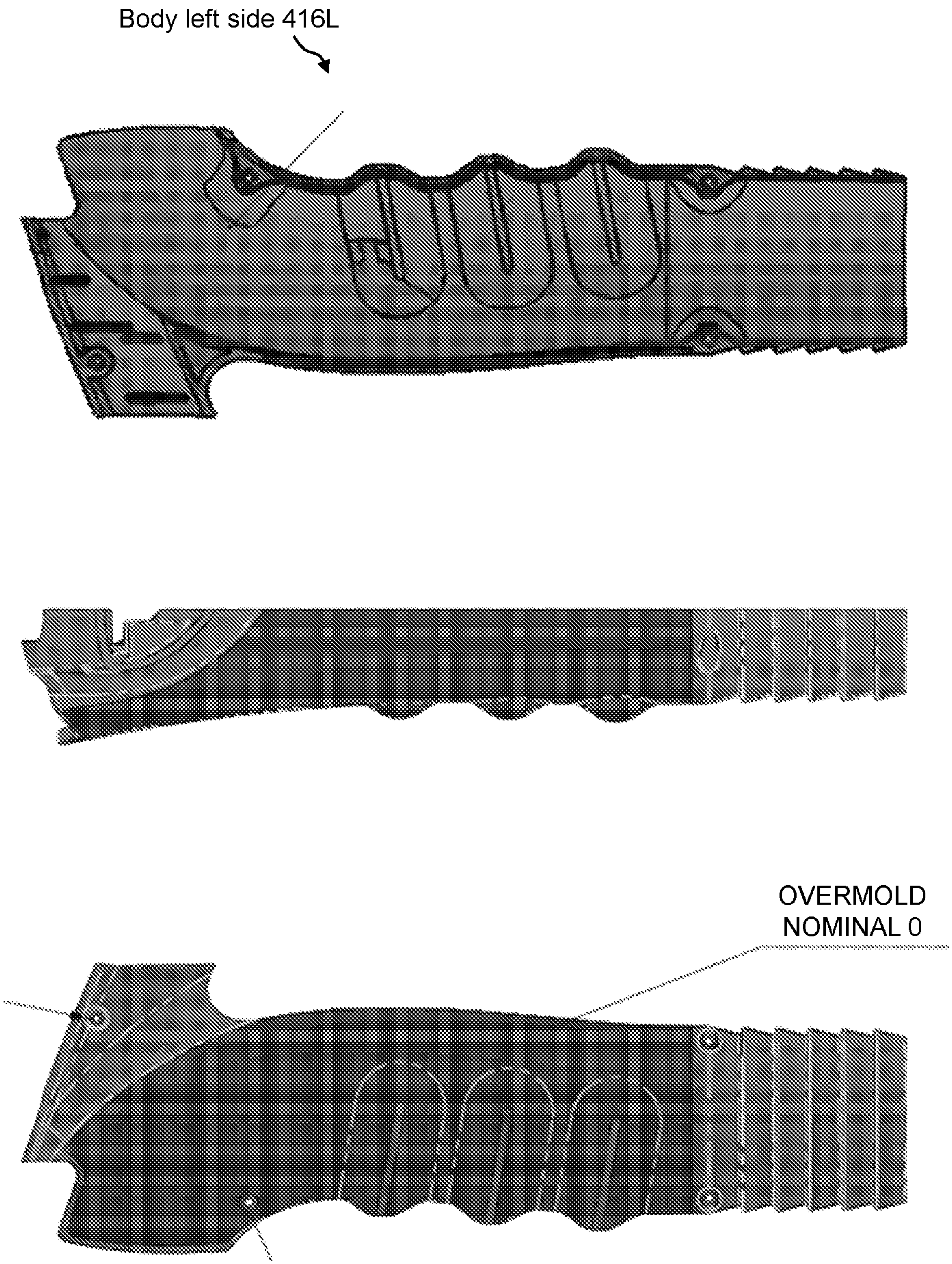
Figure 25:
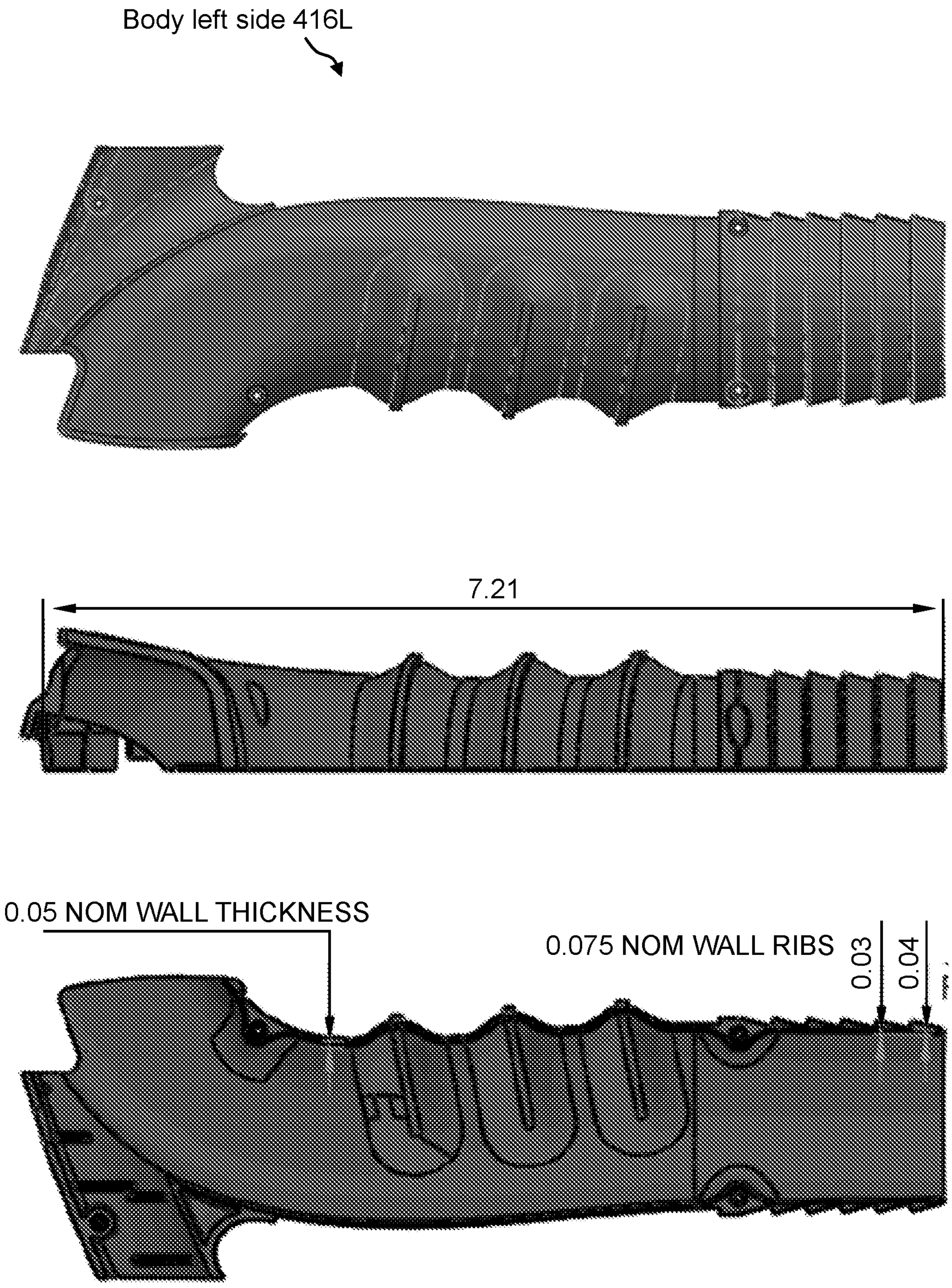
Figure 26:
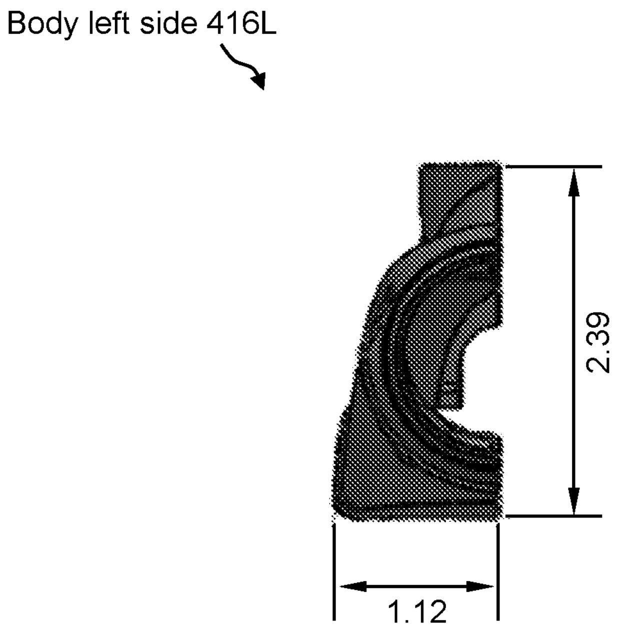
Figure 27:
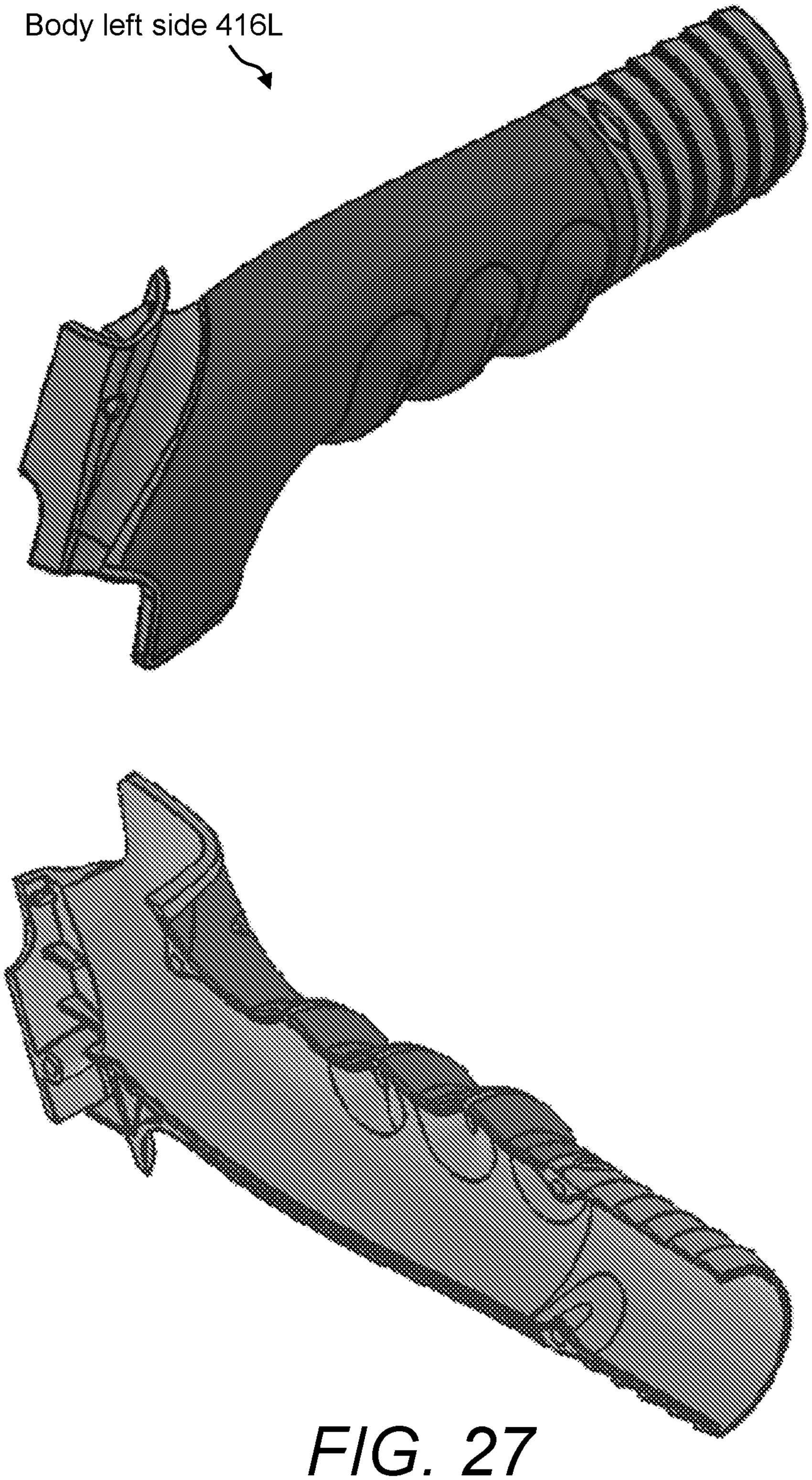
Figure 28:
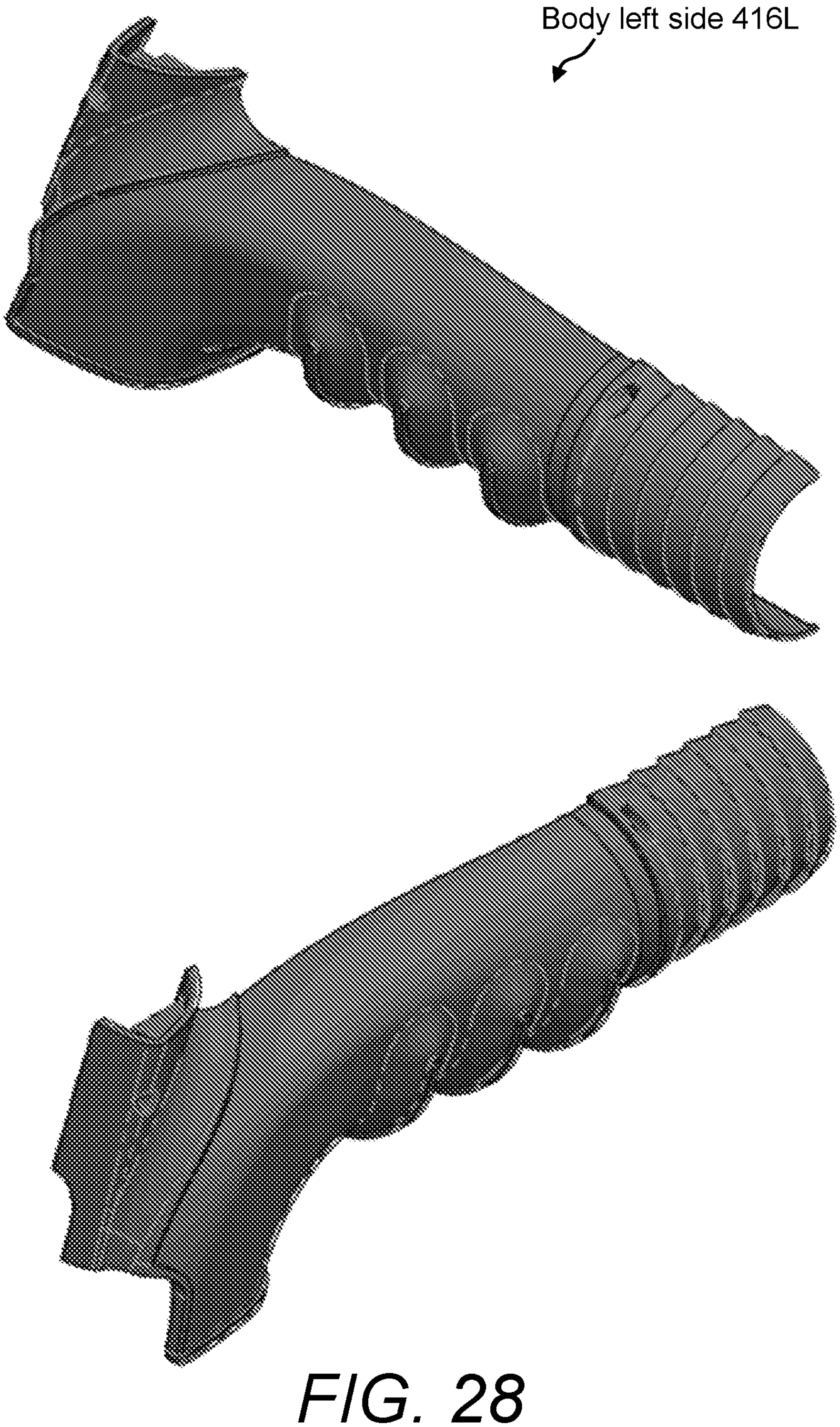
Figure 29:
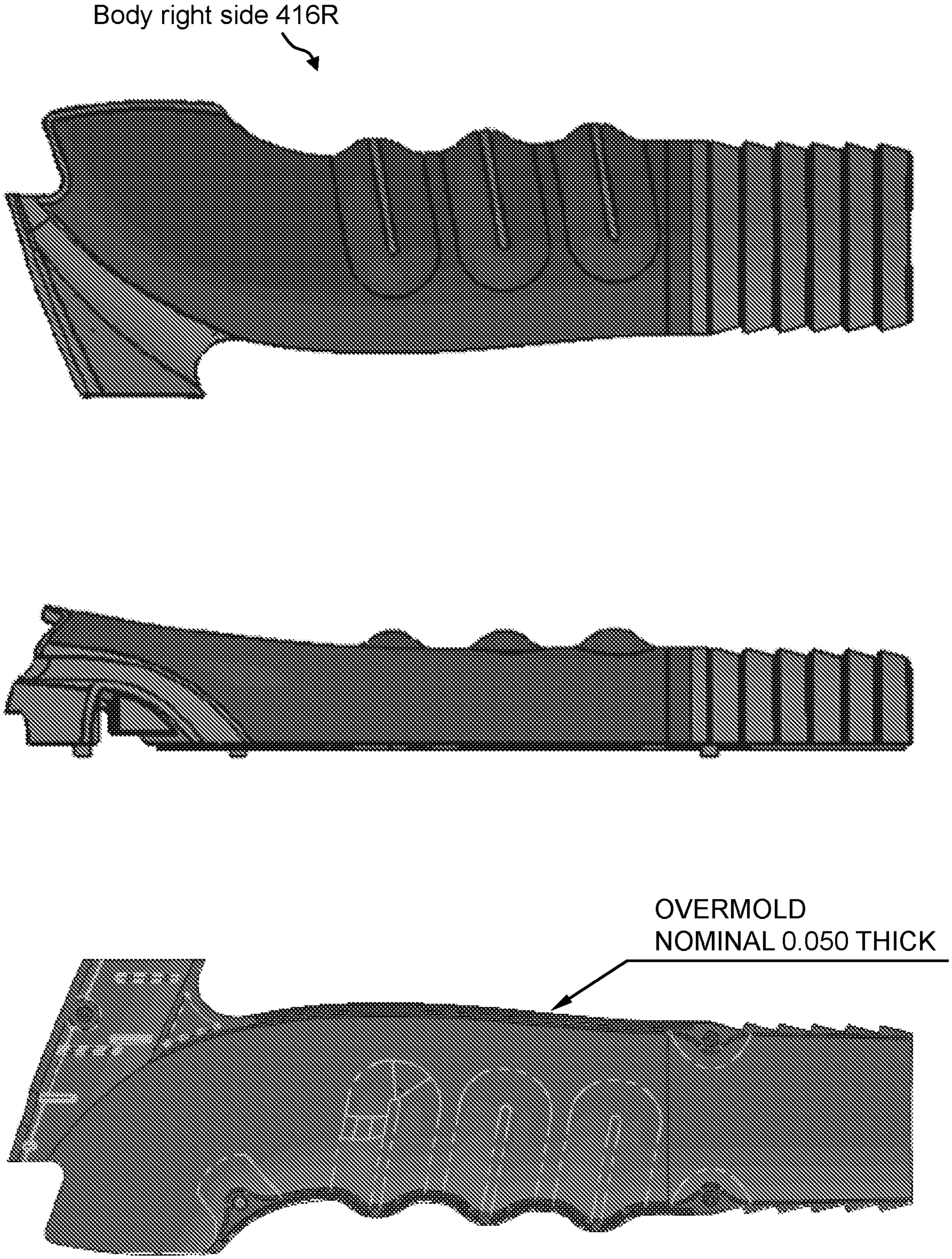
Figure 30:
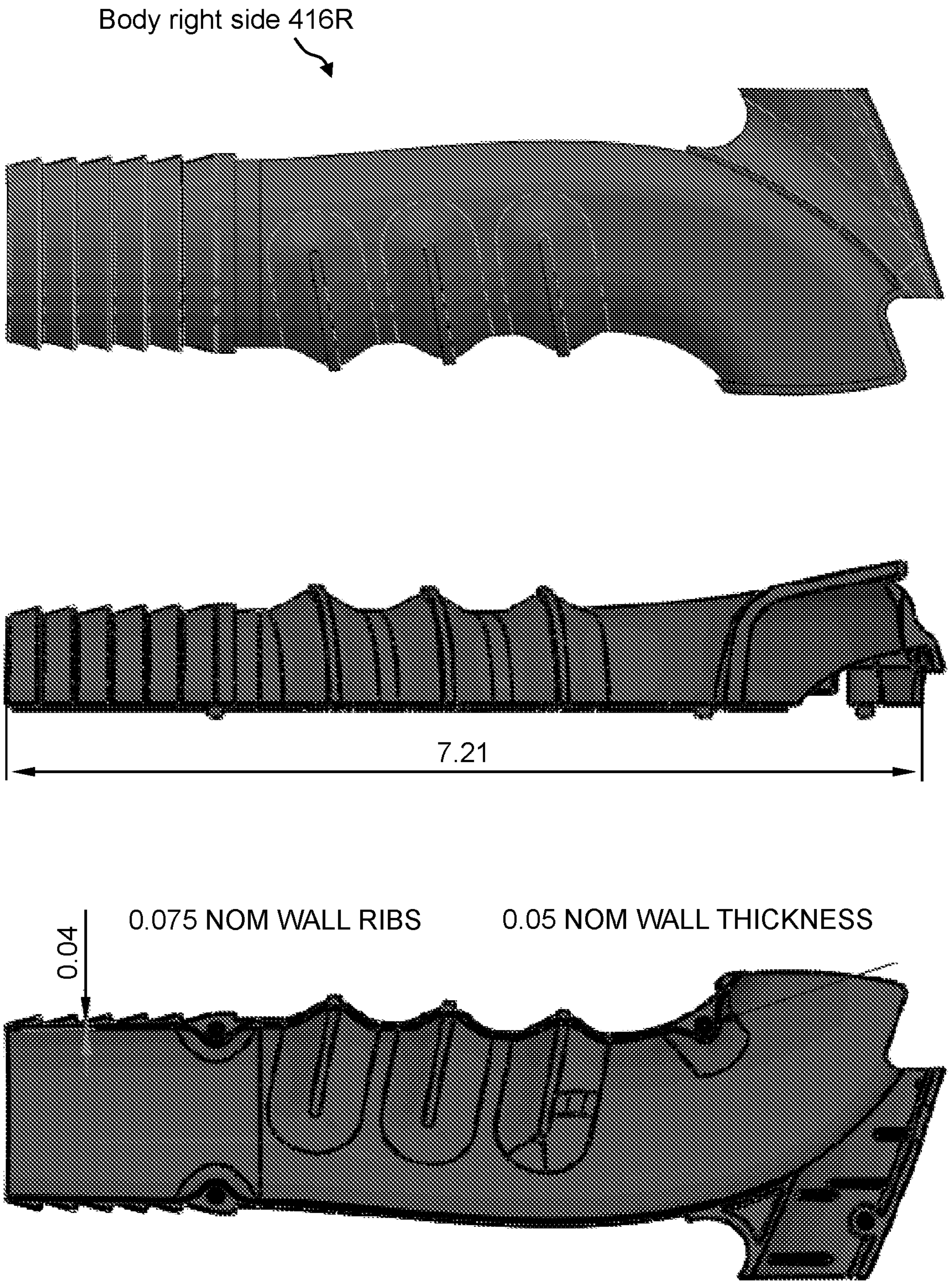
Figure 31:
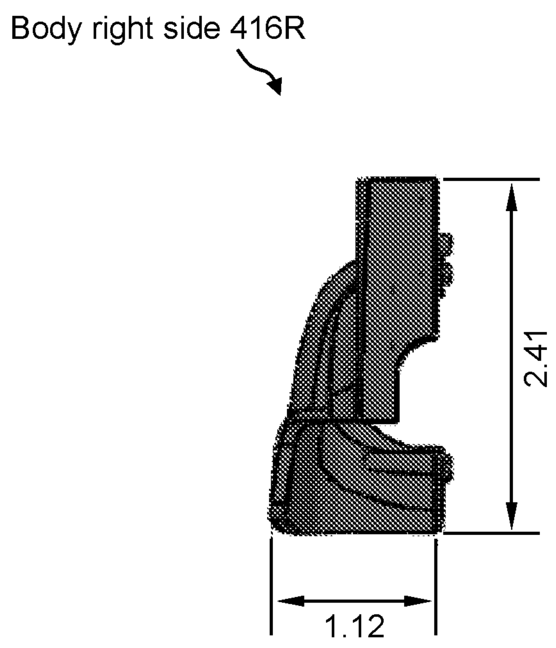
Figure 32:
Figure 33:
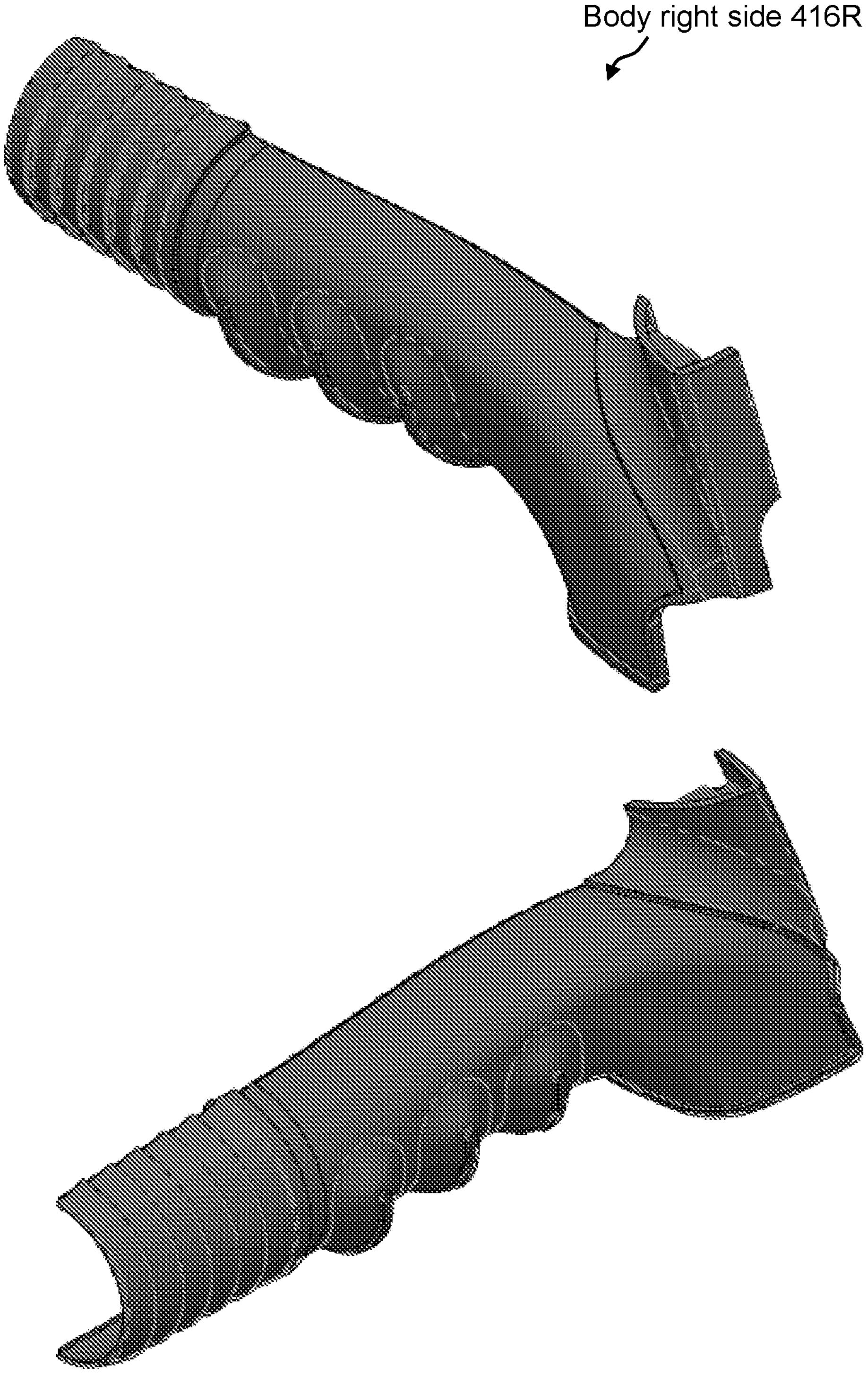

Referring now to FIG. 18 through FIG. 33 is various views of the components of the coating removal tool 410 shown in FIG. 15, FIG. 16, and FIG. 17. For example, FIG. 18 is a top view and another side view of coating removal tool 410. FIG. 19 shows various views of blade 434. FIG. 20 shows a front perspective view and a back perspective view of blade clamp 432. FIG. 21 shows a plan view and a cross-sectional view of blade clamp 432. FIG. 22 shows a front perspective view and a back perspective view of vertical member 426, which is an integrated hammerhead 428 and blade stabilizer member 430. FIG. 23 shows a front view, a cross-sectional view, a top view, and a bottom view of vertical member 426. FIG. 24 shows a side view from the inside, a top view, and a side view from the outside of body left side 416L. FIG. 25 shows a side view from the outside, a bottom view, and a side view from the inside of body left side 416L. FIG. 26 shows an end view of body left side 416L from the outlet 420-end of thereof. FIG. 27 and FIG. 28 show various perspective views of body left side 416L. FIG. 29 shows a side view from the outside, a top view, and a side view from the inside of body right side 416R. FIG. 30 shows a side view from the outside, a bottom view, and a side view from the inside of body right side 416R. FIG. 31 shows an end view of body right side 416R from the outlet 420-end of thereof. FIG. 32 and FIG. 33 show various perspective views of body right side 416R.

Test Data

Acceptable safe levels of airborne dust and in particular of lead is defined according to OSHA's Lead Standard for the Construction Industry, Title 29 Code of Federal Regulations 1926.62. The standard establishes maximum limits of exposure to lead for all workers covered, including a permissible exposure limit (PEL) and action level (AL). The PEL sets the maximum worker exposure to lead: 50 micrograms of lead per cubic meter of air (50 $\mu g/m^3$) averaged over an eight-hour period. The AL, regardless of respirator use, is an airborne concentration of 30 $\mu g/m^3$, averaged over an eight-hour period. The AL is the level at which an employer must begin specific compliance activities outlined in the standard.

Test data has been collected on the presently disclosed HEPA-qualified coating removal system 100, wherein the test data confirms low levels of airborne dust during paint disturbance using the coating removal tool 210 that is described with reference to FIG. 10 through 13. Namely, the test data show that the use of HEPA-qualified coating removal system 100, which includes coating removal tool 210, satisfies the standards as set forth in OSHA's Lead Standard for the Construction Industry, Title 29 Code of Federal Regulations 1926.62.

Samples have been collected and analyzed from several different work sites in lead abatement scenarios. The results are consistently the same from numerous projects and even prove that respiratory protection is not strictly needed at these resulting levels, although it is always recommended to wear at least a half face negative pressure respirator or P95 respirator.

Namely, personal exposure monitoring at these work sites indicates very low exposures when using HEPA-qualified coating removal system 100, often technically resulting in not having to set up work areas as stringently, lower levels of respiratory protection, much greater safe removal for the workers, and much less cleanup after removal of material as compared with, for example, conventional wetting and misting processes.

Each sample was collected using a 37 mm cassette connected to a low flow air sampling pump. The sampling pump was checked with a Rotometer before and after sampling to check the actual flow rate, the flow rate was typically 2.5 liters per minute. The samples were taken for each activity performed during a typical day/typical task. The sampling pump was worn on a belt and the sampling cassette was as close to the workers' breathing zone as possible, usually over the shoulder and hanging near or below the respirator.

Once collected, the samples were sent to an accredited laboratory for analysis using atomic absorption spectrophotometry. More specifically, the samples were sent to EMSL Analytical, Inc. (Cinnaminson, NJ) for analysis.

Referring now to FIG. 34, FIG. 35, FIG. 36, FIG. 37, FIG. 38, and FIG. 39 are examples of test results for multiple samples at multiple work sites in lead abatement scenarios. For example, FIG. 34 shows a table 500 showing the test results (Dated: Feb. 24, 2009) of multiple samples from multiple work sites. FIG. 35 shows a table 600 showing the test results (Dated: Jun. 5, 2009) of multiple samples from multiple work sites. FIG. 36 shows a table 700 showing the test results (Dated: Jun. 5, 2009) of multiple samples from multiple work sites. FIG. 37 shows a table 800 showing the test results (Dated: Apr. 20, 2010) of multiple samples from multiple work sites. FIG. 38 shows a table 900 showing the test results (Dated: Oct. 13, 2010) of multiple samples from multiple work sites. FIG. 39 shows a table 1000 showing the test results (Dated: Mar. 2, 2011) of multiple samples from multiple work sites.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

I claim:

1. Scraper apparatus for removing a coating from a surface, the scraper apparatus comprising:

a scraper body comprising a scraper handle and a scraper head;

the scraper head comprising a scraper blade holder configured to hold a scraper blade and an intake portion including an intake opening facing a side of the scraper body, the intake portion comprising an introductory flow path that leads to a scraper body flow path passing through the scraper handle, the scraper body flow path leading to an outlet portion of the scraper body, the outlet portion being configured to be connected to a vacuum line; and a hammerhead, configured to hammer nail heads, the hammerhead being connected to the scraper body at a side of the scraper body that is different than the side to which the intake opening faces.

2. The scraper apparatus according to claim 1, wherein the hammerhead is fixed to the scraper handle.

3. The scraper apparatus according to claim 1, wherein the hammerhead is fixed to the scraper head.

4. The scraper apparatus according to claim 1, wherein the hammerhead is integrated into the scraper handle.

5. The scraper apparatus according to claim 1, wherein the scraper handle has a wall with a cavity adapted to receive the hammerhead.

6. The scraper apparatus according to claim 5, wherein the hammerhead is flush with the wall of the scraper handle.

7. The scraper apparatus according to claim 6, wherein the hammerhead is shaped to correspond to a curve of the wall of the scraper handle.

8. The scraper apparatus according to claim 1, wherein the hammerhead comprises a raised engaging member having a nail-engaging surface raised past a surface of the scraper body at a side of the scraper body opposite the intake opening, and wherein the scraper further comprises a reinforcing vertical member extending from the hammerhead in a direction toward a side of the scraper corresponding to the intake opening.

9. The scraper apparatus according to claim 8, wherein the vertical member is integrated into the scraper head.

* * * * *